:(12) United States Patent
Lee et al.

(10) Patent No.: US 9,225,112 B2
(45) Date of Patent: Dec. 29, 2015

(54) PORTABLE USER DEVICE WITH A CLIP HAVING ELECTRICAL TERMINALS

(75) Inventors: Jeffery T. Lee, Cupertino, CA (US); Scott Krueger, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1013 days.

(21) Appl. No.: 12/987,032

(22) Filed: Jan. 7, 2011

(65) Prior Publication Data

US 2012/0176087 A1    Jul. 12, 2012

(51) Int. Cl.
*H02J 7/00* (2006.01)
*H01R 13/627* (2006.01)
*H01R 24/62* (2011.01)

(52) U.S. Cl.
CPC ............ *H01R 13/6275* (2013.01); *H01R 24/62* (2013.01)

(58) Field of Classification Search
USPC .................................................. 320/111–114
See application file for complete search history.

(56) References Cited

U.S. PATENT DOCUMENTS

| | | |
|---|---|---|
| 5,160,879 A | 11/1992 | Tortola et al. |
| 5,610,979 A | 3/1997 | Yu |
| 5,648,712 A | 7/1997 | Hahn |
| 5,772,468 A * | 6/1998 | Kowalski et al. ............. 439/506 |
| 2005/0263596 A1 | 12/2005 | Nelson et al. |
| 2007/0018609 A1 | 1/2007 | Yen |
| 2009/0134839 A1* | 5/2009 | Lin ............................... 320/110 |
| 2009/0236804 A1* | 9/2009 | Kirsch .......................... 273/295 |
| 2011/0309789 A1* | 12/2011 | Prasad .......................... 320/107 |

OTHER PUBLICATIONS

4GB Clip-it USB Drive, http://www.verbatim.com/prod/usb-drives/everyday-usb-drives/clip-it-usb-drive-sku-97555, printed Jan. 7, 2011, 1 page.

* cited by examiner

*Primary Examiner* — Samuel Berhanu
(74) *Attorney, Agent, or Firm* — Kilpatrick Townsend & Stockton LLP

(57) ABSTRACT

Systems and methods are provided for docking a portable user device to a docking device or adapter via a clip mechanism. A portable user device may include two clip members which rotate relative to one another about an axis. A coupling pivot may be coupled to both clip members to facilitate relative rotation, and may provide a clamping force between the clip members. One or more terminals may be located on at least one of the clip members, allowing data transfer, charging, or other functions when the portable user device is docked using the clip mechanism.

19 Claims, 10 Drawing Sheets

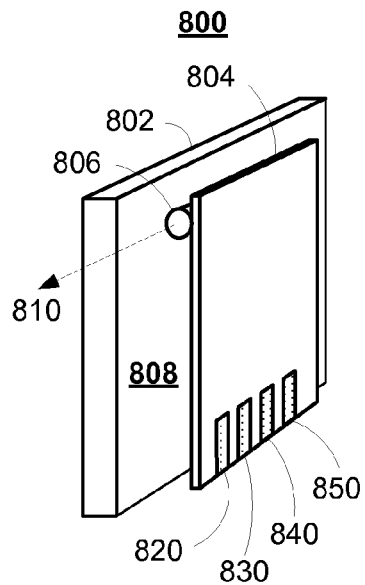
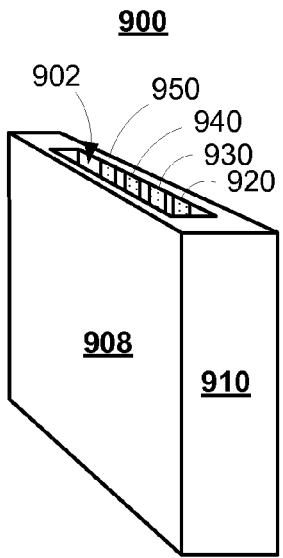
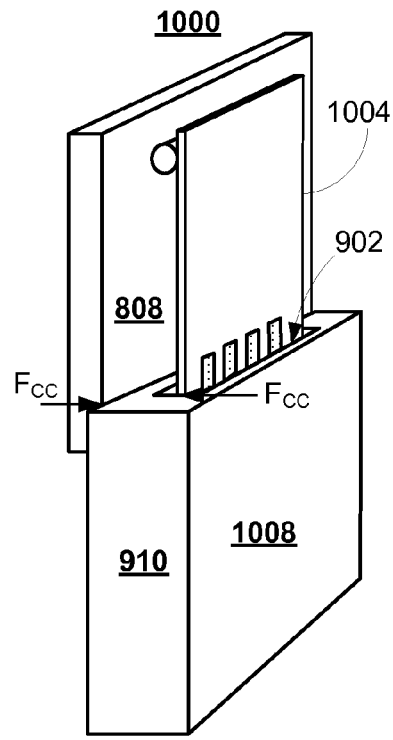
FIG. 8  FIG. 9  FIG. 10
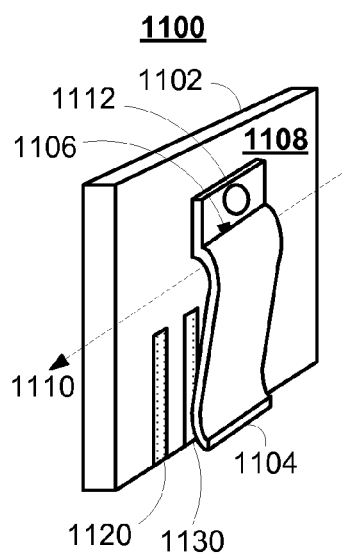
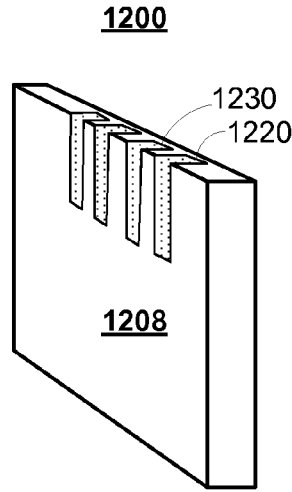
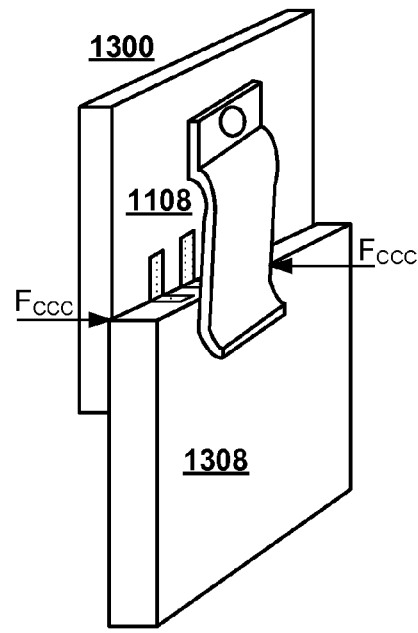
FIG. 11  FIG. 12  FIG. 13

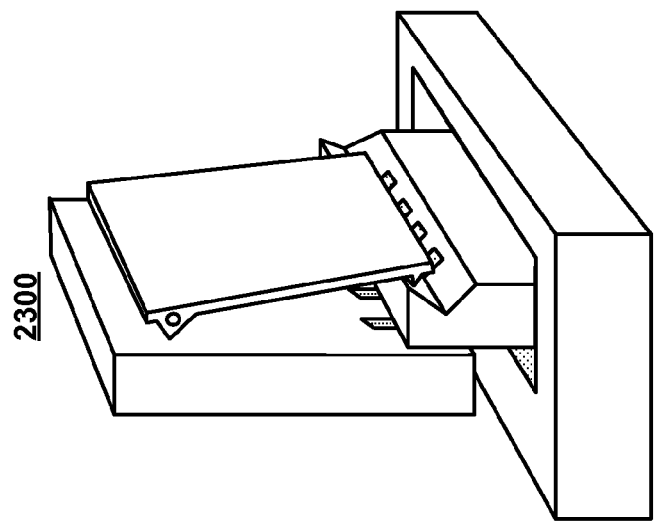
FIG. 23
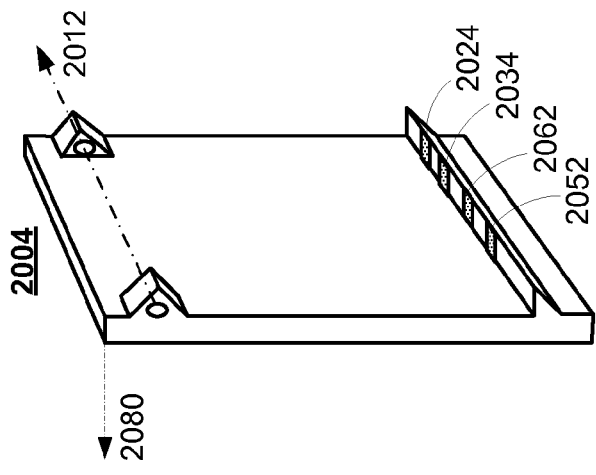
FIG. 21
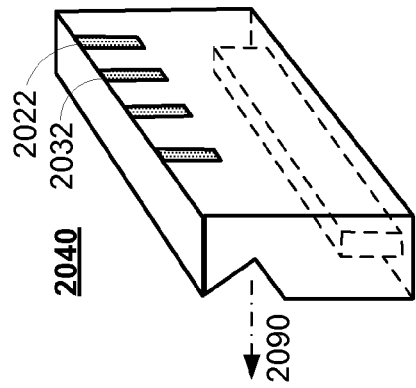
FIG. 22
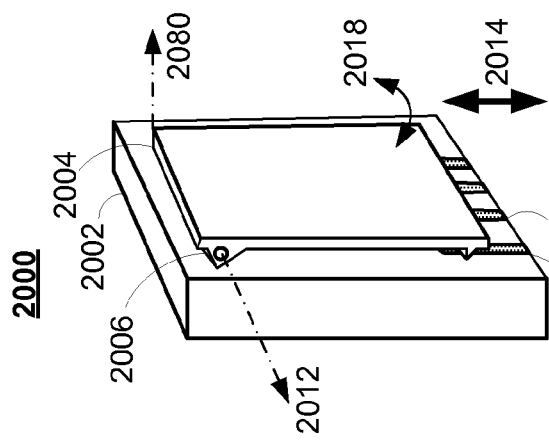
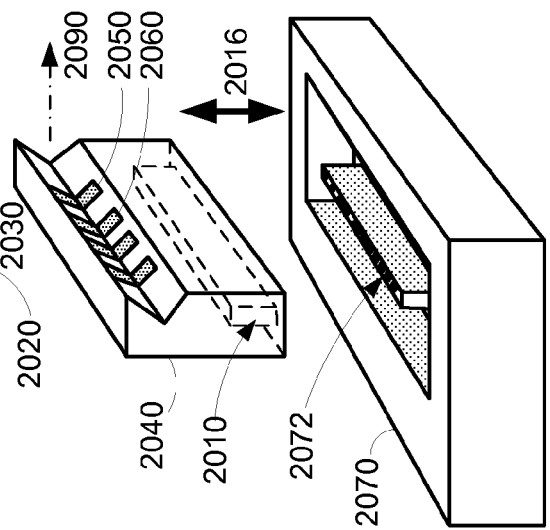
FIG. 20

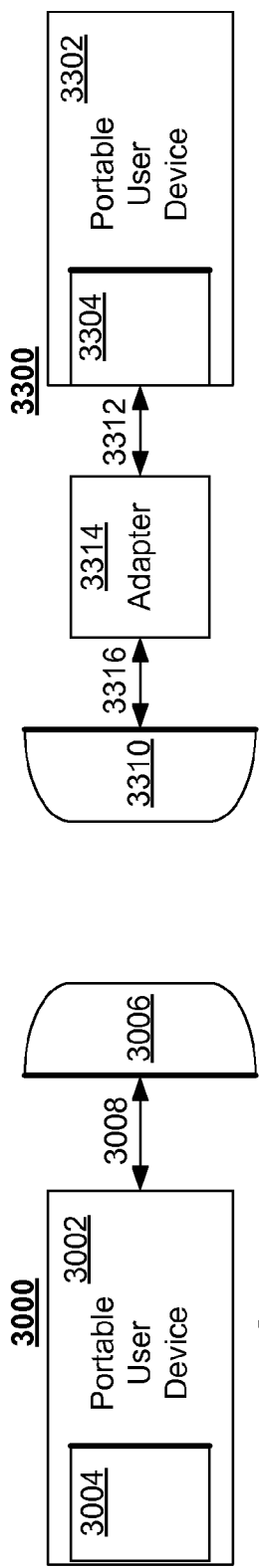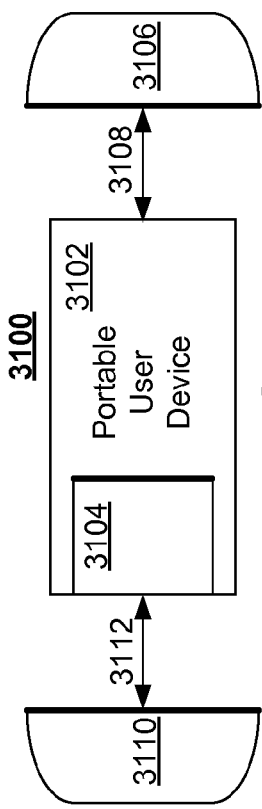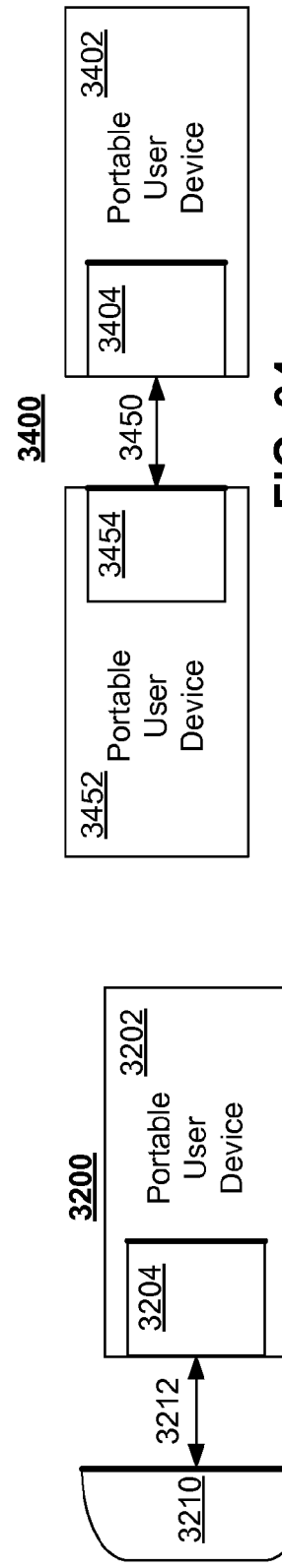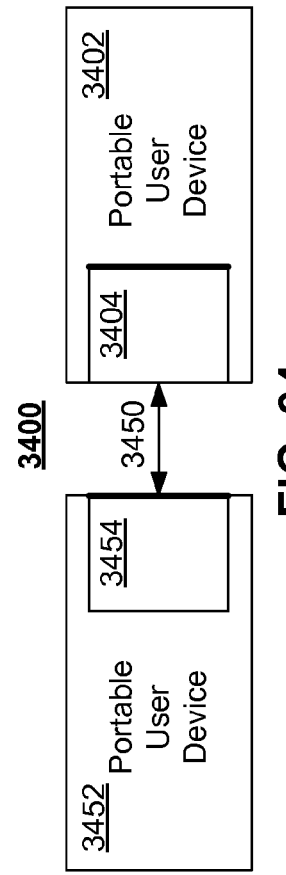

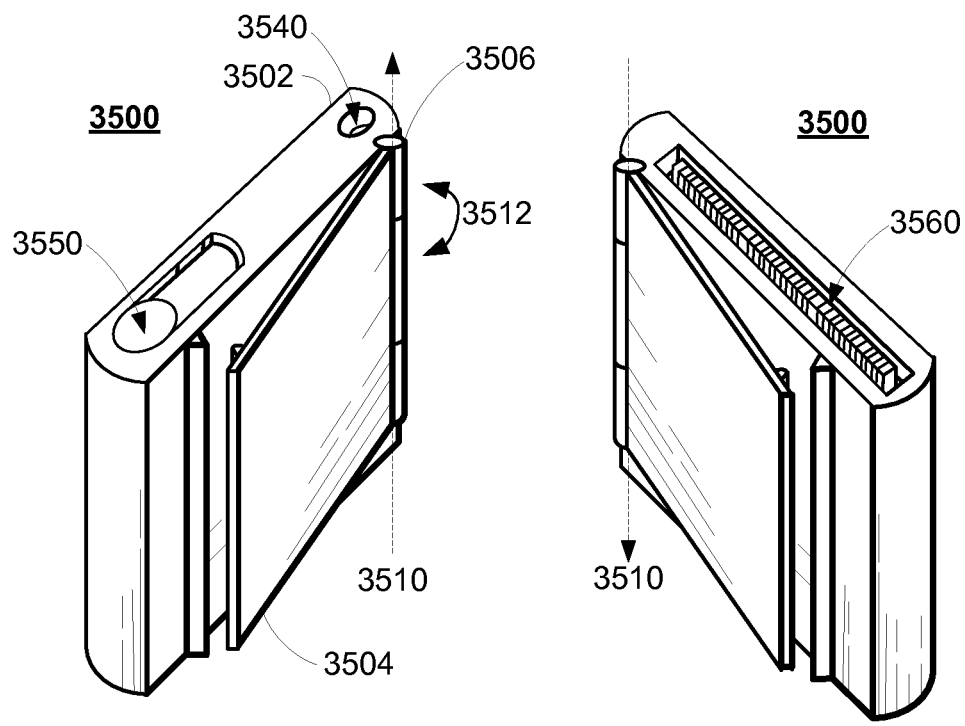
FIG. 35     FIG. 36
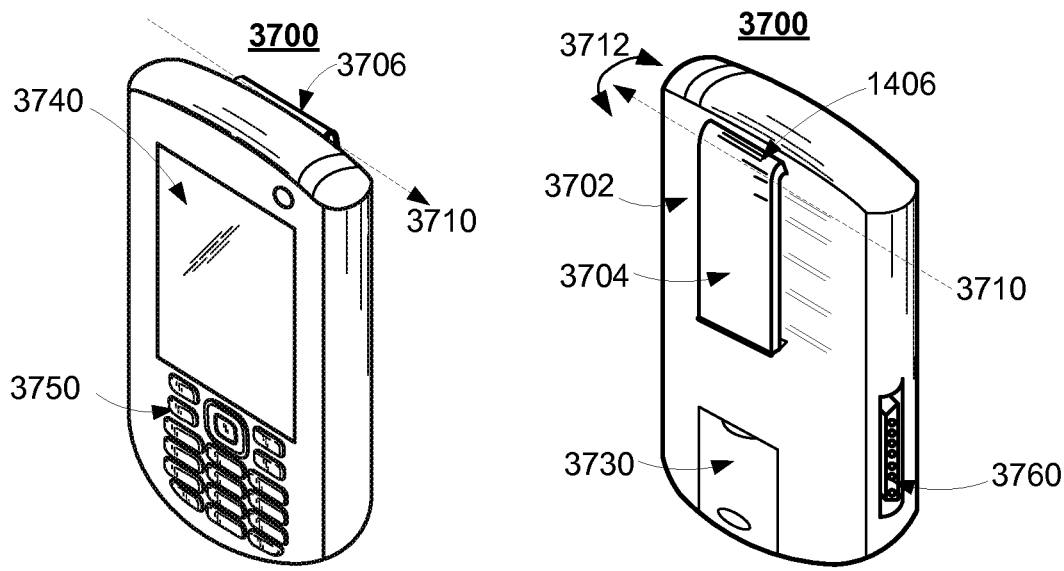
FIG. 37     FIG. 38

4100

| Terminals | Signal Type |
|---|---|
| 1 | GND |
| 2 | GND |
| 3 | Firewire signal |
| 4 | USB |
| 5 | Firewire signal |
| 6 | USB |
| 7 | Firewire signal |
| 8 | USB |
| 9 | Firewire signal |
| 10 | Accessory Identifier |
| 11 | Charging input |
| 12 | Charging input |
| 13 | Accessory power |
| 14 | Reserved |
| 15 | GND |
| 16 | GND |
| 17 | Reserved |
| 18 | Dock Tx |
| 19 | Dock Rx |
| 20 | Accessory detect |
| 21 | S-Video |
| 22 | S-Video |
| 23 | Video |
| 24 | Sense |
| 25 | Audio line in |
| 26 | Audio line in |
| 27 | Audio line out |
| 28 | Audio line out |
| 29 | Audio return |
| 30 | GND |
| 31 | Chassis GND |
| 32 | Chassis GND |

| Groups | Signal Type |
|---|---|
| 1 | GND |
| 2 | Digital Data |
| 3 | Detect (Diagnose) |
| 4 | Accessory |
| 5 | Charging |
| 6 | Video/Audio |

FIG. 42

PORTABLE USER DEVICE WITH A CLIP HAVING ELECTRICAL TERMINALS

The present disclosure is directed towards portable user device docking. More particularly, the present disclosure is directed, in some embodiments, towards a portable user device with a clip member having electrical terminals.

BACKGROUND

User devices such as mobile phones and portable media players are typically coupled to docking devices to transfer data or provide charging. This coupling is typically a plug and socket type connection. For example, a media player containing a battery may be plugged into a docking device to allow for recharging of the battery.

User devices may be portable, capable of being carried or transported by a user. Such devices may include a clip mechanism, used to affix the device to, for example, an article of clothing or exercise accessory of a user. Other than mechanical clamping, the clip typically provides no other function.

SUMMARY

This disclosure relates to systems and methods for using a clip member of a portable user device to provide electrical coupling to a receiving receptacle. In some embodiments, a portable user device may include a rechargeable battery, and a clip member that is electrically coupled to the rechargeable battery. The rechargeable battery may be charged by electrically coupling the clip member to a receiving receptacle. In some embodiments, the clip member may provide a clamping force which aids in maintaining contact between the receiving receptacle and the clip member.

BRIEF DESCRIPTION OF THE DRAWINGS

FIG. 8 shows a perspective view of an illustrative portable user device in accordance with some embodiments of the present disclosure;

FIG. 9 shows a perspective view of an illustrative docking device in accordance with some embodiments of the present disclosure;

FIG. 10 shows a side elevation view of some elements of FIGS. 8 and 9 in accordance with some embodiments of the present disclosure;

FIG. 11 shows a perspective view of an illustrative portable user device in accordance with some embodiments of the present disclosure;

FIG. 12 shows a perspective view of an illustrative docking device in accordance with some embodiments of the present disclosure;

FIG. 13 shows a perspective view of some elements of FIGS. 11 and 12 in accordance with some embodiments of the present disclosure;

FIG. 20 shows a perspective view of an illustrative portable user device, adapter, and docking device in accordance with some embodiments of the present disclosure;

FIG. 21 shows a perspective view of one illustrative clip member of FIG. 20 in accordance with some embodiments of the present disclosure;

FIG. 22 shows a perspective view of the illustrative adapter of FIG. 20 in accordance with some embodiments of the present disclosure;

FIG. 23 shows a perspective view of an illustrative portable user device, adapter, and docking device in a docking arrangement in accordance with some embodiments of the present disclosure;

FIG. 30 is a diagram of an illustrative arrangement of a portable user device and a receiving receptacle in accordance with some embodiments of the present disclosure;

FIG. 31 is a diagram of an illustrative arrangement of a portable user device and receiving receptacles in accordance with some embodiments of the present disclosure;

FIG. 32 is a diagram of an illustrative arrangement of a portable user device and a receiving receptacle in accordance with some embodiments of the present disclosure;

FIG. 33 is a diagram of an illustrative arrangement of a portable user device, receiving receptacle and an adapter in accordance with some embodiments of the present disclosure;

FIG. 34 is a diagram of an illustrative arrangement of two portable user devices in accordance with some embodiments of the present disclosure;

FIG. 35 shows a top perspective view of an illustrative portable user device in accordance with some embodiments of the present disclosure;

FIG. 36 shows a bottom perspective view of the portable user device of FIG. 35 in accordance with some embodiments of the present disclosure;

FIG. 37 shows a front perspective view of an illustrative portable user device in accordance with some embodiments of the present disclosure;

FIG. 38 shows a rear perspective view of the portable user device of FIG. 37 in accordance with some embodiments of the present disclosure;

FIG. 41 is a table of illustrative terminal assignments in accordance with some embodiments of the present disclosure;

FIG. 42 is a table of illustrative terminal groupings in accordance with some embodiments of the present disclosure;

DETAILED DESCRIPTION

The present disclosure is directed towards arrangements providing electrical coupling between a portable user device and a docking device via a clip member of the portable user device. Portable user devices such as mobile phones, media players, personal digital assistants, and other devices may transfer (e.g., upload, download, stream, synchronize) data with a docking device. Portable user devices may include one or more energy storage devices (e.g., batteries) which may receive charge (e.g., electrical energy transfer) from a docking device.

The term "docking device" as used herein refers to a device which may include a receiving receptacle which may itself include one or more terminals for communicating with a particular portable user device. The term "receiving receptacle" as used herein refers to interface hardware (e.g., one or more terminals, one or more arrays of terminals, a signal source, a receiver, a plug, a socket) of a docking device which may be suitably arranged to communicate with a portable user device. A docking device may include one or more receiving receptacles. For example, a docking device may be a computer which includes suitable terminals (e.g., included as part of one or more receiving receptacles) which may be coupled to corresponding terminals of a portable user device.

In accordance with the present disclosure, portable user devices may include a clip member which may electrically couple to a docking device. A clip member may include one or more electrical terminals that may engage with a receiving receptacle of the docking device which may include electrical terminals which correspond to (e.g., mate with) those of the portable user device. In some embodiments, a portable user device with a clip member may be clamped onto or otherwise engaged with an adapter device, which may, in turn, be electrically coupled to a docking device.

In some embodiments, the clamping force provided by clip members may maintain contact between electrical terminals of the portable user device and corresponding electrical terminals of a receiving receptacle of a docking device.

The present disclosure is described more fully in the context of FIGS. 1-44 below.

Figure 1:
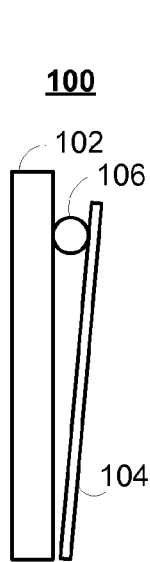
FIG. 1 shows a side elevation view of an illustrative portable user device in accordance with some embodiments of the present disclosure.

Shown in FIG. 1 is a side elevation view of illustrative portable user device 100 in accordance with some embodiments of the present disclosure. Portable user device 100 may include first clip member 102, second clip member 104 and coupling pivot 106. Coupling pivot 106 may be coupled to both first and second clip members 102 and 104, and may allow the clip members to rotate relative to one another about the coupling pivot.

In some embodiments, a clip member (e.g., clip member 102 or 104) may include one or more electrical terminals which may be exposed, recessed, raised, overlaid, or otherwise integrated into the clip member. Electrical terminals may include pins, blades, spade terminals, ring terminals, tabs, corresponding sockets, any other suitable feature, or any combination thereof created from any suitable material (e.g., metal). The electrical terminals may be electrically coupled to any suitable components included in any of the one or more clip members.

Electrical terminals may be configured to accommodate direct current (DC) signals, alternating current (AC) signals, or any combinations thereof, operating at any suitable voltage. For example, electrical terminals may accommodate signals of 5 volt DC (VDC), 120 volts AC (VAC), or any other suitable voltages. In some embodiments, electrical terminals of a device may be configured to each accommodate particular signal types, voltages, currents, electrical waveforms, communication protocols, or other communication designations which may be used to transfer electrical signals between a portable user device and a docking device. For example, a single portable user device may include multiple electrical terminals, subsets of which each may be configured for universal serial bus (USB) communication, Firewire® communication, charging, and communication with accessories such as earphones.

In some embodiments, a clip member may include solid state memory hardware, a rechargeable battery, processing equipment, a display, any other component or any combination thereof which may be electrically coupled to one or more electrical terminals.

Coupling pivot 106 of portable user device 100 may include a hinge, flex pivot, or other type of mechanical coupling which may allow relative rotation of the clip members about a suitable axis. In some embodiments, a deformable spring element may provide a clamping force between the two clip members.

Figure 2:
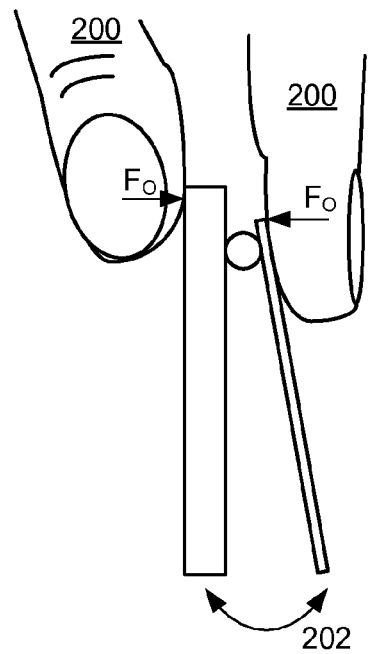
FIG. 2 shows a side elevation view of the illustrative portable user device of FIG. 1 and a user in accordance with some embodiments of the present disclosure.

Shown in FIG. 2 is a side elevation view of portable user device 100 and user 200 in accordance with some embodiments of the present disclosure. In some embodiments, user 200 may manipulate first and second clip members 102 and 104 (e.g., cause the clip members to rotate relative to one another) by applying suitable opening force $F_O$ (as shown in FIG. 2). In some embodiments, suitable application of opening force $F_O$ may cause relative rotation (as shown by motion arrow 202) between first clip member 102 and second clip member 104. For example, user 200 may apply opening force $F_O$ to increase the distance between the ends of first clip member 102 and second clip member 104 away from coupling pivot 106. In some embodiments, an application of opening force $F_O$ may aid in docking portable user device 100 to a suitable docking device.

In some embodiments, a receiving receptacle of a docking device may be configured to interface with a portable user device. A docking device may be standalone, coupled to an external device (e.g., a computer, a power supply), integrated as a component of a device (e.g., a computer, a power supply), or any suitable combination thereof. In some embodiments, a docking device may include one or more receiving receptacles which may be configured to electrically couple to a portable user device via a plug and socket connector, clip interface, any other suitable hardware interface, or any suitable combination thereof. For example, a receiving receptacle of a docking device may be electrically coupled to a wall power outlet (e.g., a residential 120 VAC outlet). In a further example, a portable user device may be affixed to a receiving receptacle of a docking device by a clamping force provided by clip members of the portable user device.

Figure 3:
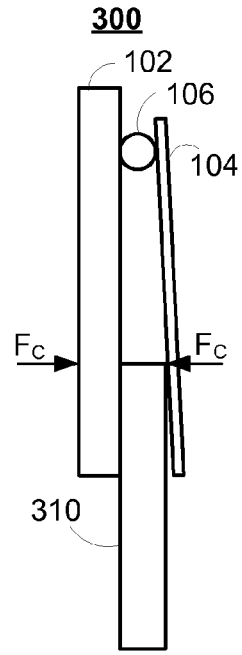
FIG. 3 shows a side elevation view of an illustrative docking arrangement in accordance with some embodiments of the present disclosure.

Shown in FIG. 3 is a side elevation view of portable user device 100 and docking device 310 in illustrative docking arrangement 300 in accordance with some embodiments of the present disclosure. In some embodiments, docking may include "clipping" portable user device 100 onto docking device 310 to create contact between corresponding electrical terminals of portable user device 100 and electrical terminals of a receiving receptacle (not shown) of docking device 310. Docking device 310 may include a receiving receptacle which itself may include electrical terminals in an arrangement substantially corresponding to one or more electrical terminals of one or more clip members. The electrical terminals of docking device 310 may be electrically coupled to memory hardware, a rechargeable battery, processing equipment, a display, any other component or any combinations thereof, not included in portable user device 100 (e.g., components of a computer). Upon docking portable user device 100 to docking device 310, electrical contiguity may exist between corresponding electrical terminals of portable user device 100 and docking device 310. Electrical contiguity may allow for transfer of data, power, or both, between suitable components of portable user device 100 and docking device 310. In some embodiments, electrical contiguity may allow for transfer of data, power, or both, between suitable components of the portable user device and processing equipment (not shown in FIG. 3) electrically coupled to docking device 310. For example, electrical contiguity between electrical terminals of portable user device 100 and corresponding electrical terminals of docking device 310 may allow for data synchronization or "synching". While portable user device 100 is docked to docking device 310, synching may occur between portable user device 100 and docking device 310 or an external device (not shown) communicatively coupled to docking device 310.

Figure 4:
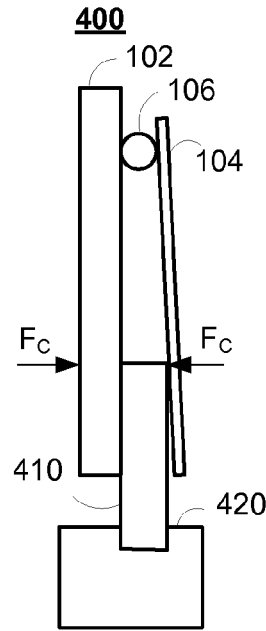
FIG. 4 shows a side elevation view of an illustrative portable user device, docking device, and adapter in accordance with some embodiments of the present disclosure.

Shown in FIG. 4 is a side elevation view of portable user device 100, docking device 420, and adapter 410 in illustrative docking arrangement 400 in accordance with some embodiments of the present disclosure. In some embodiments, portable user device 100 may be docked to a receiving receptacle of adapter 410. In some embodiments, adapter 410 may be further communicatively coupled to docking device 420. For example, adapter 410 may include a receiving receptacle which may itself include electrical terminals which correspond to electrical terminals of portable user device 100. The receiving receptacle of adapter 410 may include any suitable interfaces, terminal configurations, any other suitable features which may be used to couple portable user device 100 to docking device 420, or any combination of features thereof.

In some embodiments, an adapter may be used to couple a portable user device to a docking device which need not be configured to couple directly to the portable user device. For example, an adapter may be used to couple a portable user device with a clip interface to a plug in type 30-pin docking device. An adapter may include two or more interfaces for coupling to one or more portable user devices and one or more docking devices. Any suitable type of interface hardware, software, or both, may be included in an adapter for coupling to a docking device, including, for example, wired plugs and sockets, wireless interfaces (e.g., WiFi, BLUETOOTH), optical interfaces (e.g., IR, fiber optic), any other suitable interfaces, ports, or connections, or any suitable combinations thereof.

Figure 5:
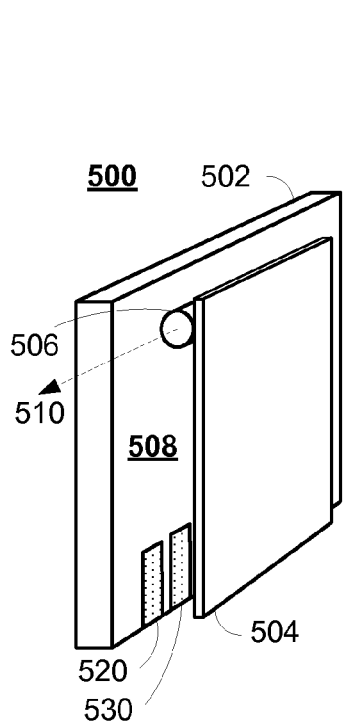
FIG. 5 shows a perspective view of an illustrative portable user device in accordance with some embodiments of the present disclosure.

Shown in FIG. 5 is a perspective view of illustrative portable user device 500 in accordance with some embodiments of the present disclosure. Portable user device 500 may include first clip member 502, second clip member 504 and coupling pivot 506. Coupling pivot 506 may be coupled to both first and second clip members 502 and 504, and may allow the clip members to rotate relative to one another about axis 510.

In some embodiments, portable user device 500 may include one or more terminals such as, for example, electrical terminals 520 and 530 arranged on first clip member 502. Although two illustrative linearly-arranged terminals of portable user device 500 are shown in FIG. 5 (e.g., electrical terminals 520 and 530), portable user device 500 may include any suitable number of terminals in any suitable arrangement (e.g., a linear thirty-terminal arrangement). Electrical terminals 520 and 530 may be coupled to processing equipment, memory, an energy storage device (e.g., a rechargeable battery), any other suitable components which may be included in portable user device 500, or any combinations thereof. Electrical terminals 520 and 530 may be, for example, recessed relative to surface 508, raised relative to surface 508, exposed, covered by a movable cover, any other suitable arrangement, or any combination thereof. Terminals may be located on any suitable clip member, or combination of members, and arranged in any suitable arrangement.

In an illustrative example, electrical terminals 520 and 530 may be spring loaded and raised relative to surface 508. When portable user device 500 is docked to the a suitable docking device, electrical terminals 520 and 530 may be depressed so that they are substantially coincident with surface 508 and in contact with corresponding electrical terminals of the docking device.

In some embodiments, electrical terminals included in the first or second clip members, or both, may be electrically coupled to components, terminals or both, of the other clip member via individual wires (not shown), a suitable ribbon cable (not shown), rotating contacts included in coupling pivot 506 (not shown), any other suitable components for electrically coupling components or terminals of two clip members, or any combination thereof. For example, in some embodiments, first clip member 502 may include a rechargeable battery with two charging terminals. Two wires may be coupled to the two charging terminals of the rechargeable battery. The two wires may also extend through coupling pivot 506 to second clip member 504.

Figure 6:
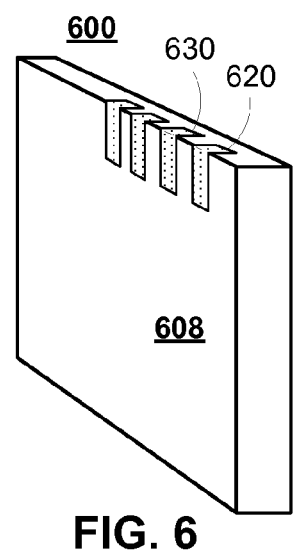
FIG. 6 shows a perspective view of an illustrative docking device in accordance with some embodiments of the present disclosure.

Shown in FIG. 6 is a perspective view of illustrative docking device 600 in accordance with some embodiments of the present disclosure. In some embodiments, a receiving receptacle of docking device 600 may include electrical terminals 620 and 630 which may correspond to electrical terminals 520 and 530 of portable user device 500. In some embodiments docking device 600 may include any other suitable receiving receptacles (not shown). In some embodiments, docking device 600 may be coupled to any suitable external device (not shown) via any suitable coupling. For example, in some embodiments, docking device 600 may be a computer. In a further example, in some embodiments, docking device 600 may be a standalone device coupled (e.g., by USB cable) to a computer.

Figure 7:
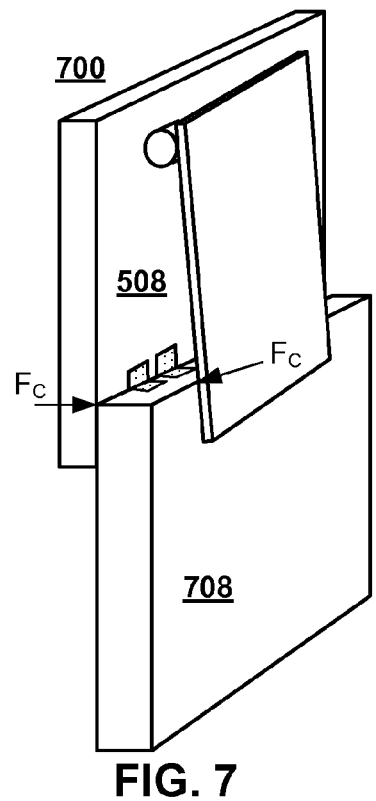
FIG. 7 shows a perspective view of an illustrative docking arrangement in accordance with some embodiments of the present disclosure.

Shown in FIG. 7 is a perspective view of portable user device 500 and docking device 600 in illustrative docking arrangement 700 in accordance with some embodiments of the present disclosure. In some embodiments, portable user device 500 may be docked to docking device 600 by, for example, arranging electrical terminals 520 and 530 in contact with electrical terminals 620 and 630, respectively. In some embodiments, first and second clip members 502 and 504 may apply clamping force $F_C$ (as shown in FIG. 7) against docking device 600, which may aid in securing portable user device 500 to docking device 600. In FIG. 7, surface 708 of docking device 600 may be opposite to surface 608 of docking device 600.

In some embodiments, electrical terminals 520 and 530, electrical terminals 620 and 630, or any suitable combinations thereof, may be raised, spring loaded, or otherwise arranged to provide suitable contact. For example, in some embodiments, electrical terminals 520 and 630 may be raised, and electrical terminals 530 and 620 may be recessed. When portable user device 500 is docked to docking device 600, surface 508 may lie coincident with surface 608, raised electrical terminal 520 may contact recessed electrical terminal 620, and raised electrical terminal 630 may contact recessed electrical terminal 530.

In some embodiments, surface 508 need not contact surface 608 when portable user device 500 is docked to docking device 600. For example, electrical terminals 520 and 530 may be raised relative to surface 508, and electrical terminals 620 and 630 may be raised relative to surface 608. When portable user device 500 is docked to docking device 600, the corresponding raised terminals may cause a space between surfaces 508 and 608.

Shown in FIG. 8 is a perspective view of illustrative portable user device 800 in accordance with some embodiments of the present disclosure. Portable user device 800 may include first clip member 802, second clip member 804 and coupling pivot 806. Coupling pivot 806 may be coupled to both first and second clip members 802 and 804, and may allow the clip members to rotate relative to one another about axis 810.

In some embodiments, portable user device 800 may include one or more terminals such as, for example, electrical terminals 820, 830, 840, and 850 arranged on second clip member 804. Although four illustrative linearly-arranged terminals of portable user device 800 are shown in FIG. 8 (e.g., electrical terminals 820, 830, 840, and 850), portable user device 800 may include any suitable number of terminals in any suitable arrangement (e.g., a linear thirty-terminal arrangement). Electrical terminals 820, 830, 840, 850, any other suitable electrical terminals, or combinations thereof, may be electrically coupled to any suitable processing equipment, memory, energy storage device (e.g., a rechargeable battery), any other suitable components which may be included in portable user device 800, or any combinations thereof. Electrical terminals 820, 830, 840, 850, or combinations thereof may be, for example, recessed, raised, exposed, covered by a movable cover, any other suitable arrangement, or any combination thereof.

In an illustrative example, electrical terminals 820, 830, 840, 850, or combinations thereof may be spring loaded and raised relative to surface 808. When portable user device 800 is docked to the a suitable docking device, electrical terminals 820, 830, 840, 850, or combinations thereof may be depressed so that they are flush with the surface of second clip member 804 and in contact with corresponding electrical terminals of the docking device.

In some embodiments, electrical terminals included in the first or second clip members, or both, may be electrically coupled to components, terminals or both, of the other clip member via individual wires (not shown), a suitable ribbon cable (not shown), rotating contacts included in coupling pivot 806 (not shown), any other suitable components for electrically coupling components or terminals of two clip members, or any combination thereof. For example, in some embodiments, first clip member 802 may include a rechargeable battery with two charging terminals. Electrical terminals 820 and 830 of second clip member 804 may, for example, each be coupled to one of the two charging terminals of the rechargeable battery.

In some embodiments, for example, a clip member (e.g., clip member 802 or 804) may include solid state memory hardware such as a flash memory card. The clip member may include flash memory card terminals (e.g., flat, exposed metal tabs), coupled to the memory hardware. A docking device may include, for example, electrical terminals corresponding to the flash memory card terminals of the clip member. In some embodiments, the clip member may be configured to insert into or otherwise engage a docking device allowing the flash memory card terminals of the first clip member to contact the corresponding terminals of the docking device. In some embodiments, the contact between terminals and corresponding terminals may be maintained by a clamping force between the first clip member and a second clip member.

Shown in FIG. 9 is a perspective view of illustrative docking device 900 in accordance with some embodiments of the present disclosure. In some embodiments, docking device 900 may include receiving receptacle 902 which may include electrical terminals 920, 930, 940, and 950 which may correspond to electrical terminals 820, 830, 840, and 850 of portable user device 800. In some embodiments, docking device 900 may include any other suitable receiving receptacles (not shown). In some embodiments, docking device 900 may be coupled to any suitable external device (not shown) via any suitable coupling. For example, in some embodiments, docking device 900 may be a computer. In a further example, docking device 900 may be a standalone device coupled (e.g., by USB cable) to a computer.

Shown in FIG. 10 shows a perspective view of portable user device 800 and docking device 900 in illustrative docking arrangement 1000 in accordance with some embodiments of the present disclosure. In some embodiments, portable user device 800 may be docked to docking device 900 by, for example, arranging electrical terminals 820, 830, 840, and 850 in contact with electrical terminals 920, 930, 940, and 950, respectively. In some embodiments, second clip member 804 may be inserted into receiving receptacle 902 to create contact between electrical terminals 820, 830, 840, and 850 of portable user device 800 and electrical terminals 920, 930, 940, and 950 of receiving receptacle 902 of docking device 900. In some embodiments, first and second clip members 802 and 804 may apply clamping force $F_{CC}$ (as shown in FIG. 10) against docking device 900, which may aid in securing portable user device 800 to docking device 900. In FIG. 10, surface 1008 of docking device 900 may be opposite to surface 908 of docking device 900.

In some embodiments, no clamping force may be applied by first clip member 802, second clip member 804, or both, while portable user device 800 is docked to docking device 900. For example, in some embodiments, receiving receptacle 902 may have dimensions just larger than the corresponding dimensions of second clip member 804. When second clip member 804 is inserted into receiving receptacle 902 (e.g., docked), friction forces may secure second clip member 804 to receiving receptacle 902, without application of clamping force $F_{CC}$. Any suitable technique, arrangement, or both, may be used to aid in docking portable user device 800 to docking device 900.

In some embodiments, electrical terminals 820, 830, 840, and 850, electrical terminals 920, 930, 940, and 950, or any suitable combinations thereof, may be raised, recessed, spring loaded, or otherwise arranged to provide suitable contact.

In some embodiments, electrical terminals (e.g., electrical terminals 820, 830, 840, or 850) may be included on any suitable surface, edge, or both of second clip member 804. For example, in some embodiments, electrical terminals may be arranged on surface 808, the surface of second clip member 804 opposite to surface 808, or any combination thereof.

Shown in FIG. 11 is a perspective view of illustrative portable user device 1100 in accordance with some embodiments of the present disclosure. Portable user device 1100 may include first clip member 1102 and second clip member 1104, which may include coupling pivot 1106. Coupling pivot 1106 may be coupled to first clip member 1102 by fixed coupling 1112, and may allow suitable portions of the clip members to rotate relative to one another about axis 1110.

In some embodiments, coupling pivot 1106 may be a flexural pivot. For example, application of a moment about axis 1110 may cause a corresponding deflection of coupling pivot 1106. The deflection of coupling pivot 1106 may cause suitable portions of clip members 1102 and 1104 to rotate relative to one another about axis 1110.

In some embodiments, portable user device 1100 may include one or more terminals such as, for example, electrical terminals 1120 and 1130 arranged on first clip member 1102. Although two illustrative linearly-arranged terminals of portable user device 1100 are shown in FIG. 11 (e.g., electrical terminals 1120 and 1130), portable user device 1100 may include any suitable number of terminals in any suitable arrangement (e.g., a linear thirty-terminal arrangement). Electrical terminals 1120, 1130, any other suitable electrical terminals, or combinations thereof, may be electrically coupled to any suitable processing equipment, memory, energy storage device (e.g., a rechargeable battery), any other suitable components which may be included in portable user device 1100, or any combinations thereof. Electrical terminals 1120, 1130, or combinations thereof may be, for example, recessed relative to surface 1108, raised relative to surface 1108, exposed, covered by a movable cover, any other suitable arrangement, or any combination thereof.

In an illustrative example, electrical terminals 1120, 1130, or combinations thereof may be spring loaded and raised relative to surface 1108. When portable user device 1100 is docked to the a suitable docking device, electrical terminals 1120, 1130, or combinations thereof may be depressed so that they are coincident with surface 1108 and in contact with corresponding electrical terminals of the docking device.

In some embodiments, electrical terminals included in the first or second clip members, or both, may be electrically coupled to components, terminals or both, of the other clip member via individual wires (not shown), a suitable ribbon cable (not shown), rotating contacts included in coupling pivot 1106 (not shown), any other suitable components for electrically coupling components or terminals of two clip members, or any combination thereof.

Shown in FIG. 12 is a perspective view of illustrative docking device 1200 in accordance with some embodiments of the present disclosure. In some embodiments, docking device 1200 may include a receiving receptacle which may itself include electrical terminals 1220 and 1230 which may correspond to electrical terminals 1120 and 1130 of portable user device 1100. In some embodiments, docking device 1200 may be coupled to any suitable external device (not shown) via any suitable coupling. In some embodiments, docking device 1200 may include any other suitable receiving receptacles (not shown). For example, in some embodiments, docking device 1200 may be a computer. In a further example, in some embodiments, docking device 1200 may be a standalone device coupled (e.g., by USB cable) to a computer.

Shown in FIG. 13 is a perspective view of portable user device 1100 and docking device 1200 in illustrative docking arrangement 1300 in accordance with some embodiments of the present disclosure. In some embodiments, portable user device 1100 may be docked to docking device 1200 by, for example, arranging electrical terminals 1120 and 1130 in contact with electrical terminals 1220 and 1230, respectively. In some embodiments, first and second clip members 1102 and 1104 may apply clamping force $F_{CCC}$ (as shown in FIG. 13) against docking device 1200, which may aid in securing portable user device 1100 to docking device 1200. In FIG. 13, surface 1308 of docking device 1200 may be opposite to surface 1208 of docking device 1200.

In some embodiments, no clamping force may be applied by first clip member 1102, second clip member 1104, or both, while portable user device 1100 is docked to docking device 1200.

In some embodiments, electrical terminals 1120 and 1130, electrical terminals 1220 and 1230, or any suitable combinations thereof, may be raised, recessed, spring loaded, or otherwise arranged to provide suitable contact.

Figure 14:
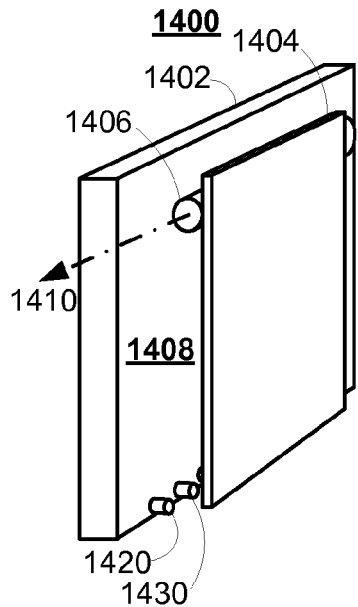
FIG. 14 shows a perspective view of an illustrative portable user device in accordance with some embodiments of the present disclosure.

Shown in FIG. 14 is a perspective view of illustrative portable user device 1400 in accordance with some embodiments of the present disclosure. Portable user device 1400 may include first clip member 1402 and second clip member 1404, which may include coupling pivot 1406. Coupling pivot 1406 may be coupled to both first clip member 1402 and clip member 1404, and may allow suitable portions of the clip members to rotate relative to one another about axis 1410.

In some embodiments, portable user device 1400 may include one or more terminals such as, for example, electrical terminals 1420 and 1430 arranged on first clip member 1402. Although two illustrative linearly-arranged terminals of portable user device 1400 are shown in FIG. 14 (e.g., electrical terminals 1420 and 1430), portable user device 1400 may include any suitable number of terminals in any suitable arrangement (e.g., a linear thirty-terminal arrangement). Electrical terminals 1420, 1430, any other suitable electrical terminals, or combinations thereof, may be electrically coupled to any suitable processing equipment, memory, energy storage device (e.g., a rechargeable battery), any other suitable components which may be included in portable user device 1400, or any combinations thereof. Electrical terminals 1420, 1430, or combinations thereof may be, for example, recessed relative to surface 1408, raised relative to surface 1408, exposed, covered by a movable cover, any other suitable arrangement, or any combination thereof.

In an illustrative example, electrical terminals 1420, 1430, or combinations thereof may be pins which are raised relative to surface 1408.

In some embodiments, electrical terminals included in the first or second clip members, or both, may be electrically coupled to components, terminals or both, of the other clip member via a suitable ribbon cable (not shown), rotating contacts included in coupling pivot 1406, any other suitable components for electrically coupling components or terminals of two clip members, or any combination thereof.

Figure 15:
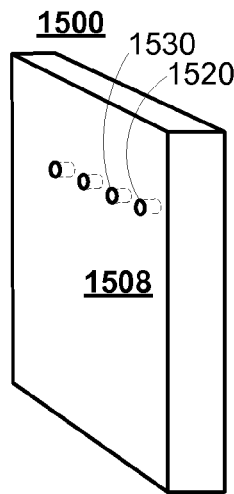
FIG. 15 shows a perspective view of an illustrative docking device in accordance with some embodiments of the present disclosure.

Shown in FIG. 15 is a perspective view of illustrative docking device 1500 in accordance with some embodiments of the present disclosure. In some embodiments, docking device 1500 may include a receiving receptacle which may itself include electrical terminals 1520 and 1530 recessed from surface 1508 which may correspond to electrical terminals 1420 and 1430 of portable user device 1400. For example, electrical terminals 1520 and 1530 may be holes corresponding to pins (e.g., electrical terminals 1420 and 1430 of FIG. 14). In some embodiments, holes (e.g., electrical terminals 1520 and 1530) may be lined with metal, include metal inserts, or otherwise provide electrically conductive contact with corresponding pins (e.g., electrical terminals 1420 and 1430).

In some embodiments, docking device 1500 may be coupled to any suitable external device (not shown) via any suitable coupling. In some embodiments, docking device 1500 may included any other suitable receiving receptacles (not shown). For example, in some embodiments, docking device 1500 may be a computer. In a further example, in some embodiments, docking device 1500 may be a standalone device coupled (e.g., by USB cable) to a computer.

Figure 16:
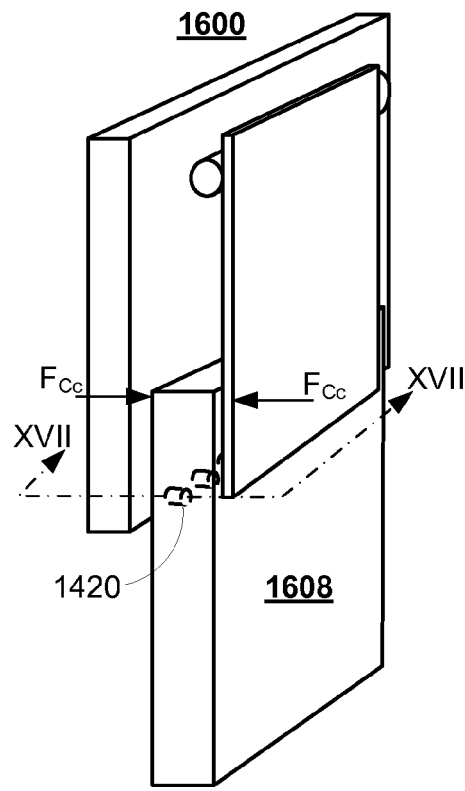
FIG. 16 shows a perspective view of some elements of FIGS. 14 and 15 in accordance with some embodiments of the present disclosure.

Shown in FIG. 16 shows a perspective view of portable user device 1400 and docking device 1500 in illustrative docking arrangement 1600 in accordance with some embodiments of the present disclosure. In some embodiments, portable user device 1400 may be docked to docking device 1500 by, for example, arranging electrical terminals 1420 and 1430 in contact with electrical terminals 1520 and 1530, respectively. In some embodiments, first and second clip members 1402 and 1404 may apply clamping force $F_{Cc}$ (as shown in FIG. 16) against docking device 1500, which may aid in securing portable user device 1400 to docking device 1500. In FIG. 16, surface 1608 of docking device 1500 may be opposite to surface 1508 of docking device 1500.

In some embodiments, no clamping force may be applied by first clip member 1402, second clip member 1404, or both, while portable user device 1400 is docked to docking device 1500.

In some embodiments, a receiving receptacle may include one or more electrical terminals which may be pins, and a portable user device may include one or more corresponding electrical terminals which may be holes.

Figure 17:
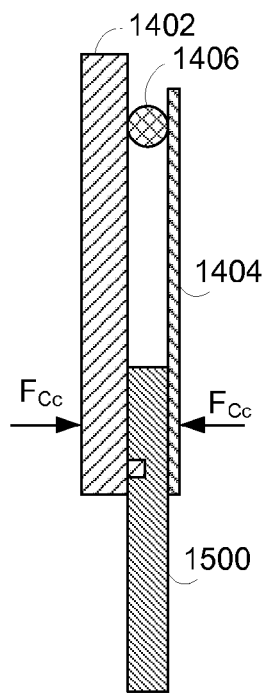
FIG. 17 shows a cross-sectional view of some elements of FIG. 16, taken from line XVII-XVII, in accordance with some embodiments of the present disclosure.

Shown in FIG. 17 is a cross sectional view of portable user device 1400 and docking device 1500, taken from line XVII-XVII of FIG. 16, in illustrative docking arrangement 1600 in accordance with some embodiments of the present disclosure. Reference line XVII-XVII of FIG. 16 is coincident with the centerline of illustrative electrical terminal 1420 of portable user device 1400. In some embodiments, docking may include "clipping" portable user device 1400 onto docking device 1500 to create contact between corresponding terminals of portable user device 1400 and docking device 1500. For example, in some embodiments, docking portable user device 1400 to docking device 1500 may include inserting one or more pins (e.g., electrical terminals 1420 and 1430 of portable user device 1400) into one or more holes (e.g., electrical terminals 1520 and 1530 of docking device 1500) or other suitable electrical terminals.

Electrical terminals are discussed in the context of FIGS. 1-17 for purposes of illustration rather than limitation. In some embodiments, a portable user device without one or more electrical terminals arranged on a clip member may be clipped (e.g., docked) to a receiving receptacle of a docking device. For example, a docking device may be configured to inductively charge the battery of a portable user device, and need not require contact of corresponding electrical terminals for docking. In a further example, one or more optical terminals (e.g., fiber optic connectors) may be included on one or more clip members of a portable user device. A docking device may include a receiving receptacle which may include corresponding optical terminals which may engage the first optical terminals of the clip member, allowing optical signals to be transferred between the receiving receptacle of the docking device and the portable user device. Any suitable type of coupling (e.g., electrical, optical, inductive) between a docking device and a portable user device with a clip may be achieved using the clip mechanism of the portable user device.

Figure 18:
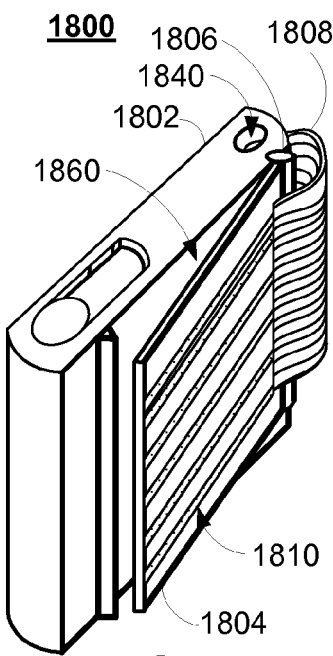
FIG. 18 shows a perspective view of an illustrative portable user device in accordance with some embodiments of the present disclosure.

Shown in FIG. 18 is a perspective view of illustrative portable user device 1800 in accordance with some embodiments of the present disclosure. Portable user device 1800 may include first clip member 1802, second clip member 1804, coupling pivot 1806, any other suitable components, or any combination thereof. Coupling pivot 1806 may be coupled to both first clip member 1802 and second clip member 1804, and may allow the clip members to rotate relative to one another. In some embodiments, portable user device 1800 may include port 1840, separate from the clip mechanism, configured to electrically couple to one or more devices, connectors, or accessories (e.g., earphones).

In some embodiments, portable user device 1800 may include one or more terminals 1810 arranged on at least one of first clip member 1802 and second clip member 1804 (e.g., electric terminals 1810 arranged on second clip member 1804). In some embodiments, electrical terminals 1810 may be coupled to first clip member 1802 via ribbon cable 1808, any other suitable components, or any combination thereof. Although illustrative ribbon cable 1808 is shown in FIG. 18, any suitable components may be included in portable user device 1800. For example, individual wires, printed circuits, layered circuits, any suitable electrically insulating components, any other electrically conductive path, or any combination thereof may be used to create electrical contiguity between first and second clip members 1802 and 1804. For example, one or more insulated wires may be used to electrically couple electrical terminals of first clip member 1802 and second clip member 1804.

In some embodiments, ribbon cable 1808 or portions thereof may be arranged internal to first clip member 1802, second clip member 1804, coupling pivot 1806, any other suitable components, or any combination thereof. For example, in some embodiments, ribbon cable 1808, or any other suitable electrical coupling between first and second clip members 1802 and 1804, may be arranged in the clip interior, represented by region 1860 within the acute angle between the clip members. Any suitable arrangement, components, or both, may be used to electrically couple first clip member 1802 and second clip member 1804.

In some embodiments, ribbon cable 1808 may be electrically coupled to any suitable components included in first clip member 1802, second clip member 1804, coupling pivot 1806, any other suitable components, or any combination thereof. One or more wires of ribbon cable 1808 may be, for example, electrically coupled to one or more of electrical terminals 1810. For example, one or more wires of ribbon cable 1808 may couple one or more of electrical terminals 1810 to one or more components (e.g., a rechargeable battery, processing equipment, memory) included in first clip member 1802.

In some embodiments, second clip member 1804 may include solid state memory hardware, a rechargeable battery, processing equipment, a display, any other suitable components, or any combination thereof. In some embodiment, second clip member 1804 may include one or more electric terminals 1810, but need not include solid state memory hardware, a rechargeable battery, processing equipment, or other components.

Figure 19:
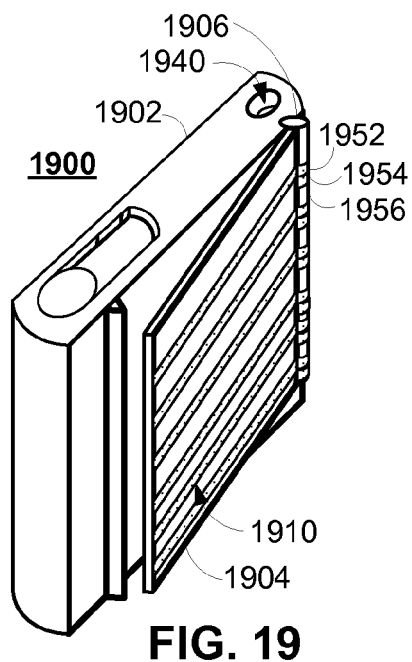
FIG. 19 shows a perspective view of an illustrative portable user device in accordance with some embodiments of the present disclosure.

Shown in FIG. 19 is a perspective view of illustrative portable user device 1900 in accordance with some embodiments of the present disclosure. Portable user device 1900 may include first clip member 1902, second clip member 1904, coupling pivot 1906, any other suitable components, or any combination thereof. Coupling pivot 1906 may be coupled to both first clip member 1902 and second clip member 1904, and may allow the clip members to rotate relative to one another. In some embodiments, portable user device 1900 may include port 1940, separate from the clip mechanism, configured to electrically couple to one or more devices, connectors, or accessories (e.g., earphones).

In some embodiments, portable user device 1900 may include one or more terminals 1910 arranged on at least one of first clip member 1902 and second clip member 1904 (e.g., electric terminals 1910 arranged on second clip member 1904). In some embodiments, electrical terminals 1910 may be coupled to first clip member 1902 via rotating contacts 1952 and 1954, insulating element 1956, any other suitable components, or any combination thereof. For example, in some embodiments, rotating contact 1952 may be in electrical contact with rotating contact 1954, which may allow electrical contiguity between first and second clip members 1902 and 1904. Insulating elements 1956 may electrically separate the circuit which includes rotating contacts 1952 and 1954 and one or more other circuits (e.g., other rotating contacts). Although illustrative coupling 1906 is shown in FIG. 19 as including rotating contacts 1952 and 1954, any suitable components may be included in portable user device 1900. For example, individual wires, printed circuits, layered circuits, any suitable electrically insulating components, any other electrically conductive path, or any combination thereof may be used to create electrical contiguity between first and second clip members 1902 and 1904.

In some embodiments, rotating contacts 1952 and 1954, insulating element 1956 or portions thereof may be arranged internal to first clip member 1902, second clip member 1904, coupling pivot 1906, any other suitable components, or any combination thereof. Any suitable arrangement, components, or both, may be used to electrically couple first clip member 1902 and second clip member 1904.

In some embodiments, rotating contacts 1952 and 1954 may be electrically coupled to any suitable components included in first clip member 1902, second clip member 1904, coupling pivot 1906, any other suitable components, or any combination thereof. Rotating contacts 1952 and 1954 may be, for example, electrically coupled to one or more of electrical terminals 1910. For example, rotating contacts 1952 and 1954 may electrically couple one or more of electrical terminals 1910 to one or more components (e.g., a rechargeable battery, processing equipment, memory) which may be included in first clip member 1902.

In some embodiments, second clip member 1904 may include solid state memory hardware, a rechargeable battery, processing equipment, any other suitable components, or any combination thereof. In some embodiment, second clip member 1904 may include one or more electric terminals 1910, but need not include solid state memory hardware, a rechargeable battery, processing equipment, or other components.

Shown in FIG. 20 is a perspective view of illustrative portable user device 2000, adapter 2040, and docking device 2070 in accordance with some embodiments of the present disclosure. Portable user device 2000 may include first clip member 2002, second clip member 2004, coupling pivot 2006, any other suitable components, or any combination thereof. Coupling pivot 2006 may be coupled to both first clip member 2002 and second clip member 2004, and may allow the clip members to rotate relative to one another about axis 2012.

Shown in FIG. 21 is a perspective view of illustrative second clip member 2004 of FIG. 20 in accordance with some embodiments of the present disclosure. Orientation arrow 2080 of FIGS. 20 and 21 shows the relative view of second clip member 2004. In some embodiments, second clip member 2004 may include electrical terminals 2052, 2062, any other suitable terminals, or any combination thereof. Although not shown, electrical terminals 2052 and 2062 may be electrically coupled to one or more suitable wires, printed circuits, layered circuits, any suitable electrically insulating components, any other electrically conductive path, or any combination thereof. In some embodiments, for example, electrical terminals 2052 and 2062 may be electrically coupled to components included in first clip member 2002 via, a ribbon cable, rotatable contacts, any other suitable electrical components, or any combination thereof. In some embodiments, for example, electrical terminals 2052 and 2062 need not be electrically coupled to first clip member 2002.

Shown in FIG. 22 is a perspective view of illustrative adapter 2040 of FIG. 20 in accordance with some embodiments of the present disclosure. In some embodiments, adapter 2040 may include a receiving receptacle which may include electrical terminals 2050 and 2060 which may correspond to electrical terminals 2052 and 2062 of portable user device 2000. In some embodiments, adapter 2040 may include a receiving receptacle which may include electrical terminals 2022 and 2032, which may correspond to electrical terminals 2020 and 2030 of portable user device 2000. A docking device may include any suitable number of terminals, arranged in any suitable receiving receptacles.

In some embodiments, adapter 2040 may include port 2010. In some embodiments, docking device 2070 may include, for example, receiving receptacle 2072. Port 2010 of adapter 2040 may include one or more terminals which may engage corresponding terminals of receiving receptacle 2072 when adapter 2040 is docked to docking device 2070. Any suitable interface or combination of interfaces may be used to communicatively couple adapter 2040 to docking device 2070.

In some embodiments, docking device 2070 may be coupled to, or included as a component of, any suitable external device (not shown) via any suitable coupling. In some embodiments, for example, docking device 2070 may be included in a computer. In a further example, in some embodiments, docking device 2070 may be a standalone device coupled (e.g., by USB cable) to a computer.

In some embodiments, second clip member 2004 may include electrical terminals 2024 and 2034 as shown in FIG. 21. When portable user device 2000 is not clipped onto another device or object, electrical terminals 2024 and 2034 may contact (e.g., electrically couple) corresponding electrical terminals 2020 and 2030, respectively, of first clip member 2002. In some embodiments, portable user device 2000 may include a diagnostic sensor or circuit which may detect the contact between electrical terminals 2024 and 2034 of second clip member 2004 and electrical terminals 2020 and 2030 of first clip member 2002, respectively. Portable user device 2000 may use the diagnostic sensor or circuit to perform a systems check. For example, if the diagnostic sensor or circuit detects that there is no contact between electrical terminals 2020 and 2030 and electrical terminals 2024 and 2034, portable user device 2000 may determine whether it has been docked to a suitable docking device.

Shown in FIG. 23 is a perspective view of illustrative portable user device 2000, adapter 2040, and docking device 2070 in docking arrangement 2300 in accordance with some embodiments of the present disclosure. In some embodiments, portable user device 2000 may be clipped onto adapter 2040, creating electrical contiguity between electrical terminals 2020, 2030, 2052, and 2062 of portable user device 2000 and corresponding electrical terminals 2022, 2032, 2050, and 2060 of adapter 2040, respectively. In some embodiments, adapter 2040 may be docked to docking device 2070 by suitably engaging port 2010 to receiving receptacle 2072 to create electrical contiguity between corresponding terminals. In some embodiments, docking portable user device 2000 may include both electrically coupling portable user device 2000 to adapter 2040 (e.g., as shown by arrow 2014 of FIG. 20), and electrically coupling adapter 2040 to docking device 2070 (e.g., as shown by arrow 2016 of FIG. 20). In some embodiments, docking portable user device 2000 may require rotating second clip members 2004 (e.g., as shown by arrow 2018 of FIG. 20) relative to first clip member 2002 to "open" the clip and then "close" the clip onto a suitable receiving receptacle (e.g., a suitable portion of adapter 2040 including one or more electrical terminals as shown in FIG. 23).

Figure 24:
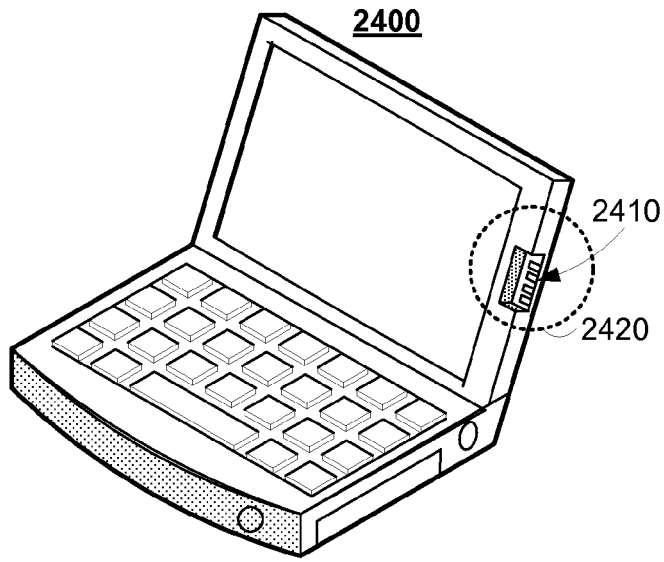
FIG. 24 shows a perspective view of an illustrative docking device in accordance with some embodiments of the present disclosure.

Shown in FIG. 24 is a perspective view of illustrative docking device 2400 in accordance with some embodiments of the present disclosure. In some embodiments, docking device 2400 may be a laptop computer, any other suitable docking device, or any combination thereof. Docking device 2400 may include one or more receiving receptacles (e.g., receiving receptacle 2410) which each include one or more terminals for coupling docking device 2400 to portable user devices, other docking devices, any other suitable devices, or any combination thereof.

Figure 25:
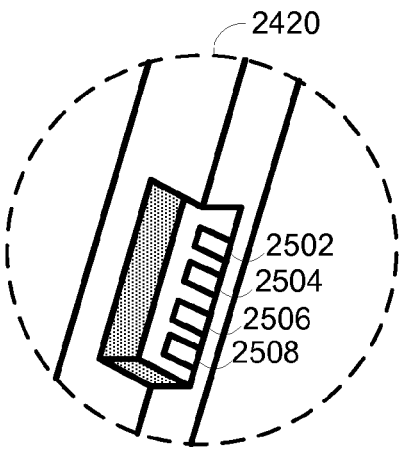
FIG. 25 shows a perspective view of an enlargement of a region of the illustrative docking device of FIG. 24 in accordance with some embodiments of the present disclosure.

Shown in FIG. 25 is a perspective view of an enlargement of a region of illustrative docking device 2400 of FIG. 24 taken from line 2420 in accordance with some embodiments of the present disclosure. Receiving receptacle 2410, shown in the region bounded by line 2420, may include one or more terminals such as, for example, electrical terminals 2502, 2504, 2506, 2508, any other suitable terminals, or any combination thereof. In some embodiments, electrical terminals 2502, 2504, 2506, and 2508 of receiving receptacle 2410 may be electrically coupled to any suitable components of docking device 2400 such as, for example, processing equipment, memory, a rechargeable battery, a power supply, a user interface, any other suitable components, or any combination thereof.

Figure 26:
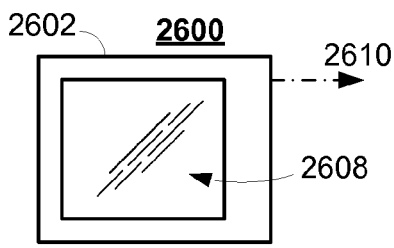
FIG. 26 shows a front elevation view of an illustrative portable user device in accordance with some embodiments of the present disclosure.
Figure 27:
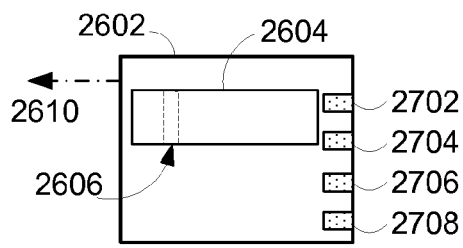
FIG. 27 shows a back elevation view of the illustrative portable user device of FIG. 26 in accordance with some embodiments of the present disclosure.
Figure 28:
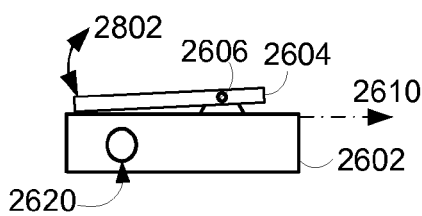
FIG. 28 shows a top plan view of the illustrative portable user device of FIG. 26 in accordance with some embodiments of the present disclosure.

Shown in FIG. 26 is a front elevation view of illustrative portable user device 2600 in accordance with some embodiments of the present disclosure. Shown in FIG. 27 is a back elevation view of portable user device 2600 in accordance with some embodiments of the present disclosure. Shown in FIG. 28 is a top plan view of portable user device 2600 in accordance with some embodiments of the present disclosure. Portable user device 2600 may include first clip member 2602, second clip member 2604, coupling pivot 2606, any other suitable components, or any combination thereof. Orientation arrow 2610 may be referred to for clarifying relative orientations of portable user device 2600 among FIGS. 26-28. For example, in some embodiments, portable user device 2600 may include display 2608, accessory (e.g., earphones) port 2620, electrical terminals 2702, 2704, 2706, and 2708, any other suitable components, or any combination thereof. In some embodiments, docking portable user device 2600 may require rotating second clip members 2604 (e.g., as shown by arrow 2802 of FIG. 28) relative to first clip member 2602 to "open" the clip and then "close" the clip onto a suitable receiving receptacle (e.g., receiving receptacle 2410 of FIG. 24).

In some embodiments, electrical terminals 2702, 2704, 2706, and 2708 of portable user device 2600 may correspond to electrical terminals 2502, 2504, 2506, and 2508 of docking device 2400, respectively. In some embodiments, docking portable user device 2600 to docking device 2400 may create electrical contiguity between electrical terminals 2702, 2704, 2706, and 2708 of portable user device 2600 and electrical terminals 2502, 2504, 2506, and 2508 of docking device 2400, respectively.

Figure 29:
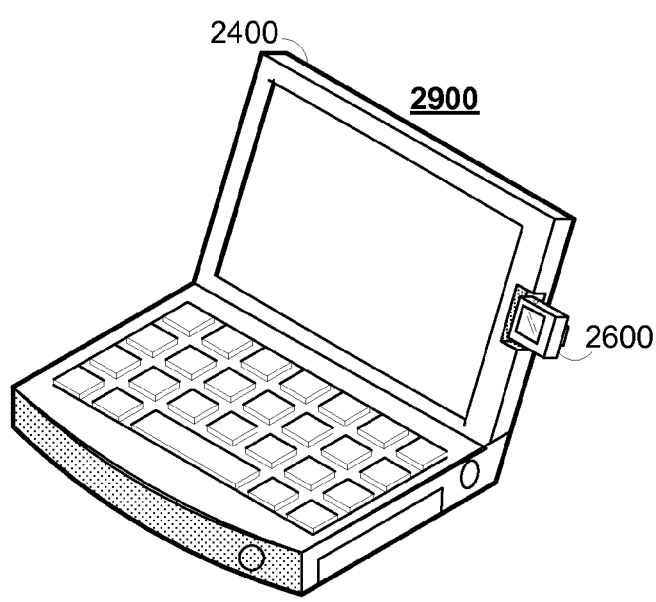
FIG. 29 shows a perspective view of the illustrative docking device of FIG. 24 and the portable user device of FIGS. 26-28 in an illustrative docking arrangement in accordance with some embodiments of the present disclosure.

FIG. 29 shows a perspective view of illustrative docking device 2400 and portable user device 2600 in illustrative docking arrangement 2900 in accordance with some embodiments of the present disclosure. Docking arrangement 2900 may allow data transfer, charging, or any other suitable function between portable user device 2600 and docking device 2400, or any combination thereof.

Shown in FIGS. 30-34 are diagrams of illustrative arrangements 3000, 3100, 3200, 3300, and 3400, respectively, of portable user devices, receiving receptacles, and adapters in accordance with some embodiments of the present disclosure.

In some embodiments, portable user device 3002, which may include clip member 3004, may be coupled to receiving receptacle 3006 via coupling 3008, as shown in FIG. 30. Portable user device 3002 may be any suitable device which may include a clip member (e.g., clip member 3004). In some embodiments, clip member 3004 need not be used to couple portable user device 3002 to receiving receptacle 3006. In some embodiments, coupling 3008 may include any suitable type of wired connection such as, for example, a 30-pin cable with suitable connectors (e.g., plugs and sockets), a USB cable with suitable connectors, a wire cable with 3.5 mm TRS type connectors, any other suitable wired connection, or any combination thereof. In some embodiments, coupling 3008 may include any suitable type of wireless coupling which may include any suitable hardware, software, or both. In some embodiments, coupling 3008 may be used to transfer data between portable user device 3002 and receiving receptacle 3006, recharge portable user device 3002 from a suitable power supply coupled to receiving receptacle 3006, perform any other suitable docking function, or any combination thereof. Receiving receptacle 3006 may be included in, or otherwise coupled to, any suitable docking device. The docking device may send or receive data, charge, or both, via receiving receptacle 3006.

In some embodiments, portable user device 3102, which includes clip member 3104, may be coupled to receiving receptacle 3106 via coupling 3108, and to receiving receptacle 3110 via coupling 3112, as shown in FIG. 31. Portable user device 3102 may be any suitable device which may include a clip member (e.g., clip member 3104). In some embodiments, receiving receptacle 3106 and receiving receptacle 3110 may be included in a single docking device. In some embodiments, receiving receptacle 3106 and receiving receptacle 3110 may be separate devices (e.g., external to each other) or may be included in separate devices. In some embodiments, receiving receptacle 3106 and receiving receptacle 3110 may be separate receptacles (e.g., external to each other), but may be included in a single docking device. For example, a single docking device may include two separate receiving receptacles which need not have similar configurations.

In some embodiments, clip member 3104 may be used to couple portable user device 3102 to receiving receptacle 3110, but need not be used to couple portable user device 3102 to receiving receptacle 3106. In some embodiments, coupling 3108 may include any suitable type of wired connection such as, for example, a 30-pin cable with suitable connectors (e.g., plugs and sockets), a USB cable with suitable connectors, any other suitable wired connection, or any combination thereof. In some embodiments, coupling 3108 may include any suitable type of wireless coupling which may include any suitable hardware, software, or both. In some embodiments, coupling 3108 may be used to transfer data between portable user device 3102 and receiving receptacle 3106, recharge portable user device 3102 from a suitable power supply coupled to receiving receptacle 3106, any other suitable docking function, or any combination thereof.

In some embodiments, clip member 3104 may be used to couple portable user device 3102 to receiving receptacle 3110. Clip member 3104 may include any suitable type of terminals (e.g., pins, tabs, blades, connectors, sockets) which may engage corresponding terminals on receiving receptacle 3110. In some embodiments, coupling 3112 may be used to transfer data between portable user device 3102 and receiving receptacle 3110, recharge portable user device 3102 from a suitable power supply coupled to receiving receptacle 3110, any other suitable docking function, or any combination thereof. In some embodiments, clip member 3104 may provide a clamping force which may aid in docking portable user device 3102 to receiving receptacle 3110. In some embodiments, coupling 3112 may represent contact between corresponding terminals of portable user device 3102 and receiving receptacle 3110.

In some embodiments, couplings 3108 and 3112 may provide different docking functionalities. For example, in some embodiments, coupling 3112 may allow charging of portable user device 3102 while coupling 3108 may allow data transfer. In some embodiments, both coupling 3108 and coupling 3112 may allow charging and data transfer.

In some embodiments, portable user device 3202, which includes clip member 3204, may be coupled to receiving receptacle 3210 via coupling 3212, as shown by arrangement 3200 of FIG. 32.

In some embodiments, clip member 3204 may be used to couple portable user device 3202 to receiving receptacle 3210. Clip member 3204 may include any suitable type of terminals (e.g., pins, tabs, blades, connectors, sockets) which may engage corresponding terminals on receiving receptacle 3210. In some embodiments, coupling 3212 may be used to transfer data between portable user device 3202 and receiving receptacle 3210, recharge portable user device 3202 from a suitable power supply coupled to receiving receptacle 3210, any other suitable docking function, or any combination thereof. In some embodiments, clip member 3204 may provide a clamping force which may aid in docking portable user device 3202 to receiving receptacle 3210. In some embodiments, coupling 3212 may represent contact between corresponding terminals of portable user device 3202 and receiving receptacle 3210. Receiving receptacle 3210 may be included in, or otherwise coupled to, any suitable docking device. The docking device may send or receive data, charge, or both, via receiving receptacle 3210.

In some embodiments, portable user device 3302 may be coupled to adapter 3314 via coupling 3312, as shown by arrangement 3300 of FIG. 33. Adapter 3314 may be further coupled to receiving receptacle 3310 via coupling 3316. Portable user device 3302 may be substantially the same as portable user device 3202 of FIG. 32, in some embodiments.

In some embodiments, clip member 3304 may be used to couple portable user device 3302 to adapter 3314. Clip member 3304 may include any suitable type of terminals (e.g., pins, tabs, blades, connectors, sockets) which may engage corresponding terminals on adapter 3314. In some embodiments, clip member 3304 may provide a clamping force which may aid in docking portable user device 3302 to adapter 3314. In some embodiments, coupling 3312 may represent contact between corresponding terminals of portable user device 3302 and adapter 3314.

In some embodiments, adapter 3314 may be coupled to receiving receptacle 3310 via coupling 3316. In some embodiments, coupling 3312, adapter 3314, coupling 3316 and receiving receptacle 3310 may form a series coupling. The series coupling may be used to transfer data between portable user device 3302 and receiving receptacle 3310, recharge portable user device 3302 from a suitable power supply coupled to receiving receptacle 3310, any other suitable docking function, or any combination thereof. In some embodiments, adapter 3314 may include one or more arrays, each including one or more terminals. At least one of the arrays may interface to corresponding terminals of clip member 3304, while at least one other array may interface to corresponding terminals of receiving receptacle 3310.

In an illustrative example, receiving receptacle 3310 may include a 30-pin plug arrangement. Portable user device 3302 may include an array of one or more terminals on clip member 3304 which are not capable of interfacing directly to a 30-pin plug. Adapter 3314 may include both a 30-pin socket arrangement which interfaces to receiving receptacle 3310, and an array of terminals corresponding to the terminals of clip member 3304. Coupling clip member 3304 to adapter 3314, and adapter 3314 to receiving receptacle 3310 may allow data transfer, charging, or both, between portable user device 3302 and receiving receptacle 3310.

In some embodiments, portable user device 3402, which includes clip member 3404, may be coupled to portable user device 3452, which includes clip member 3454, via coupling 3450 as shown by arrangement 3400 of FIG. 34.

In some embodiments, clip members 3404 and 3454 may be used to couple portable user device 3402 to portable user device 3402 via coupling 3450. In some embodiments, coupling 3450 may be used to transfer data between portable user device 3402 and portable user device 3452, recharge portable user device 3402 or portable user device 3452 from each other, any other suitable docking function, or any combination thereof. Clip member 3404 may include any suitable type of terminals (e.g., pins, tabs, blades, connectors, sockets) which may engage corresponding terminals on clip member 3454. In some embodiments, clip member 3404, clip member 3454, or both, may provide a clamping force which may aid in docking portable user device 3402 to portable user device 3452. Coupling 3450 may represent contact between corresponding terminals of portable user device 3402 and portable user device 3452.

It will be understood that any of the elements and arrangements of FIGS. 30-34 may be rearranged, omitted, appended, combined, or otherwise altered in accordance with the present disclosure. Any of receiving receptacles 3006, 3106, 3110, 3210, and 3310 may be included in any suitable docking device, coupled to any suitable docking device, or both.

Shown in FIG. 35 is a top perspective view of illustrative portable user device 3500 in accordance with some embodiments of the present disclosure. Shown in FIG. 36 is a bottom perspective view of illustrative portable user device 3500 in accordance with some embodiments of the present disclosure. Portable user device 3500 may be any suitable portable user device which includes a clip member. For example, portable user device 3500 may be a personal media player. In some embodiments, portable user device 3500 may include power switch 3550, accessory port 3540, a display, a touchpad, one or more hard commands (e.g., push buttons, dials, sliding buttons), a rechargeable battery, processing equipment, memory, a user interface, any other feature or component, or any combination thereof.

Portable user device 3500 may include, for example, first clip member 3502, second clip member 3504, and pivot coupling 3506. Coupling pivot 3506 may allow first and second clip members 3502 and 3504 to rotate relative to one another about axis 3510, as shown by motion arrows 3512. In some embodiments, coupling pivot 3506 may include any type of pivot joint such as, for example, a spring-loaded hinge.

In some embodiments, portable user device 3500 may include port 3560, not located on the clip member. In some embodiments, port 3560 of portable user device 3500 may interface to a corresponding receiving receptacle (e.g., plug and socket connector). Port 3560 may allow data transfer, charging, or both, between portable user device 3500 and one or more suitable docking devices.

Shown in FIG. 37 is a front perspective view of illustrative portable user device 3700 in accordance with some embodiments of the present disclosure. Shown in FIG. 38 is a back perspective view of illustrative portable user device 3700 in accordance with some embodiments of the present disclosure. Portable user device 3700 may be any suitable portable user device which includes a clip mechanism (e.g., clip members and a coupling pivot). For example, portable user device 3700 may be a personal communications device. In some embodiments, portable user device 3700 may include display 3740, keypad 3750, rechargeable battery 3730, any other feature or component, or any combination thereof. Portable user device 3700 may include, for example, first clip member 3702, second clip member 3704, and pivot coupling 3706. Coupling pivot 3706 may allow first and second clip members 3702 and 3704 to rotate relative to one another about axis 3710, as shown by motion arrows 3712. In some embodiments, coupling pivot 3706 may include any type of pivot joint such as, for example, a flexural pivot.

In some embodiments, portable user device 3700 may include port 3760, not located on the clip mechanism. In some embodiments, port 3760 of portable user device 3700 may interface to a corresponding receiving receptacle (e.g., plug and socket connector). Port 3760 may allow data transfer, charging, or both, between portable user device 3700 and one or more suitable docking devices. In some embodiments, port 3760 may couple accessories such as, for example, earphones to portable user device 3700.

Figure 39:
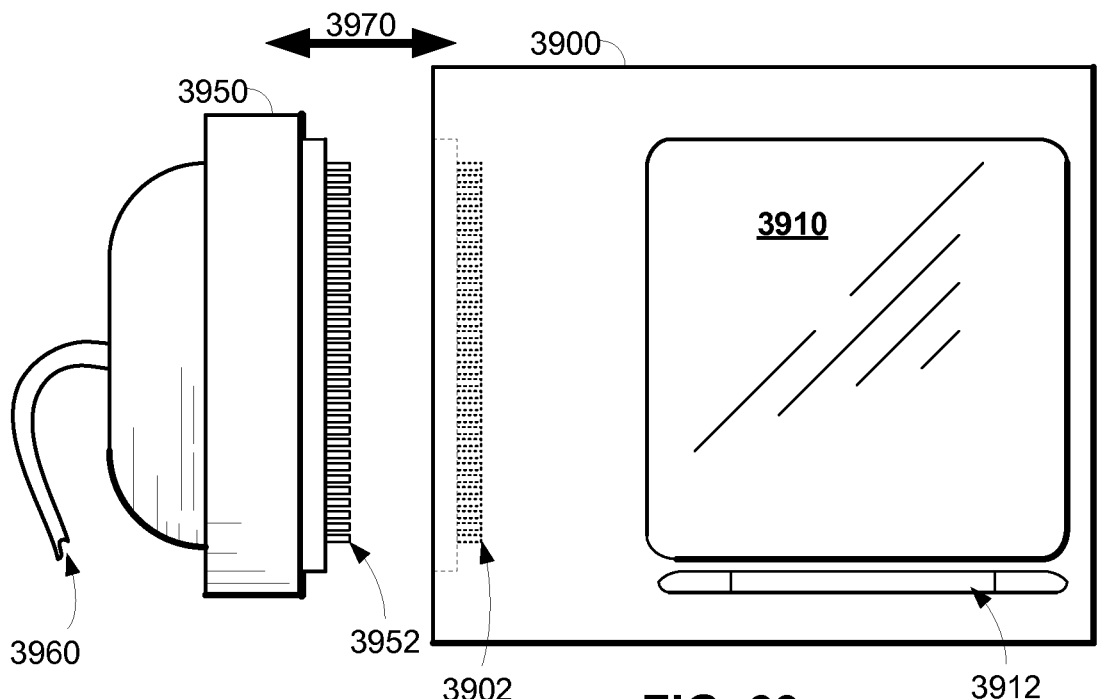
FIG. 39 is a diagram of an illustrative portable user device and an illustrative plug connector in accordance with some embodiments of the present disclosure.

Shown in FIG. 39 is a diagram of illustrative portable user device 3900 and plug 3950 in connector in accordance with some embodiments of the present disclosure. Portable user device 3900 may include, for example, pin sockets 3902 which collectively may be referred to as a socket, display 3910, buttons 3912, any other suitable components, or any suitable combination thereof.

In some embodiments, plug 3950 may include a nominally 30-pin configuration in which pins 3952 are mounted in plug 3950. Coupling 3960 may, for example, include one or more insulated wires (e.g., a bundled cable) which may electrically couple pins 3952 to any suitable external device (not shown). In some embodiments, pins 3952 may be made of a suitable metal, and electrically coupled to coupling 3960 by suitable soldering, crimping, clamping (e.g., screw down terminal), any other method of affixing electrically conductive components, or any combination thereof.

In some embodiments, pins 3952 may be inserted or "plugged" (e.g., docked as shown by motion arrows 3970) into pin sockets 3902 to create electrical contiguity between one or more components of portable user device 3900 and one or more external devices (not shown) via coupling 3960. In some embodiments, plug 3950, portable user device 3900, or both, may include a latching mechanism which may aid in maintaining contact while docked. In some embodiments, plug 3950, portable user device 3900, or both, may include a sensor to indicate a plugged condition. For example, in some embodiments, if plug 3950 is not inserted properly into portable user device 3900, the sensor may trigger an alert to a user (e.g., audible, display text, tactile rumble) regarding the improper plugging.

In some embodiments, pins 3952 and pin sockets 3902 need not be metallic or electrically conductive. For example, in some embodiments, pins 3952 and pin sockets 3902 may include a fiber optic coupling such as a TOSLINK® (Toshiba Link), SC connector, straight tip (ST) connector, any other suitable fiber optic coupling, or any combinations thereof. Any suitable technique, connector (e.g., plug and socket), arrangement, or interface may be used to couple plug 3950 to portable user device 3900.

Figure 40:
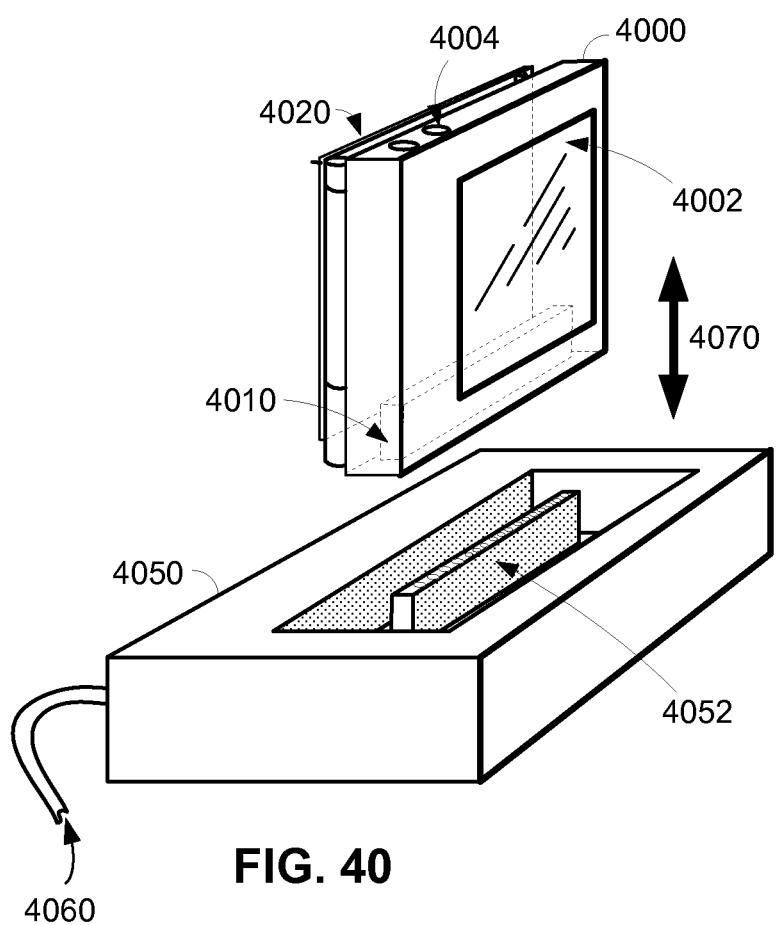
FIG. 40 is a diagram of an illustrative portable user device and an illustrative docking device in accordance with some embodiments of the present disclosure.

Shown in FIG. 40 is a diagram of illustrative portable user device 4000 and illustrative docking device 4050 in accordance with some embodiments of the present disclosure. In some embodiments, portable user device 4000 may include display 4002, clip member 4020, accessory port 4004, any other suitable features or components, or any combination thereof. Portable user device 4000 may include, for example, port 4010 which may include one or more arrays of one or more terminals. Socket 4010 may engage receiving receptacle 4052 of docking device 4050 which may include one or more arrays of corresponding terminals to the terminals of port 4010. In some embodiments, portable user device 4000 may be docked to docking device 4050 by coupling port 4010 to receiving receptacle 4052 (e.g., by pressing via motion arrows 4070). Docking portable user device 4000 to docking device 4050 may allow data transfer, charging, or both. Docking device 4050 may communicate with other devices (not shown) via coupling 4060 which may include a wire, bundled wire, fiber optic cable, wireless network connection, any other suitable coupling, or any combination thereof.

Shown in FIG. 41 is table 4100 of illustrative terminal assignments in accordance with some embodiments of the present disclosure. In some embodiments, an array of terminals (e.g., metal pins) may have any or all of the functionalities included in table 4100. For example, particular subsets of terminals may be used for USB data transfer, USD charging, Firewire (e.g., IEEE 1394 interface) data transfer, serial protocol data transfer, accessory inputs and outputs (e.g., audio in and out), ground, any other suitable function, or any combination thereof. It will be understood that table 4100 shows illustrative terminal assignments, and that some embodiments may use different terminal assignments. Any suitable number of terminals and arrangement of terminals may be used in accordance with the present disclosure. In an illustrative example, the terminal assignments of table 4100 may be used to designate electrical terminals of a plug such as plug 3950 of FIG. 39.

Shown in FIG. 42 is table 4200 of illustrative terminal groupings in accordance with some embodiments of the present disclosure. For example, the terminals included in table 4100 may be grouped according to function, as shown by table 4200. Terminals 3, 5, 7, and 9 may be used for Firewire data transmittal, and terminals 4, 6 and 8 may be used for USB data transmittal. Collectively, these terminals may be termed "data" terminals. Similarly, terminals may be collectively referred to as, for example, grounding terminals (e.g., terminals 1, 2, 15, 16, 30-32), digital data terminals (e.g., terminals 3-8), detect terminals (e.g., terminal 24), accessory terminals (e.g., terminals 13, 20), charging terminals (e.g., terminals 11, 12), audio/video terminals (e.g., terminals 21-23, 25-29), any other terminal designation, or any combination thereof. Table 4200 of FIG. 42 shows several illustrative terminal designations, which may be used to refer to terminals collectively by function.

Figure 43:
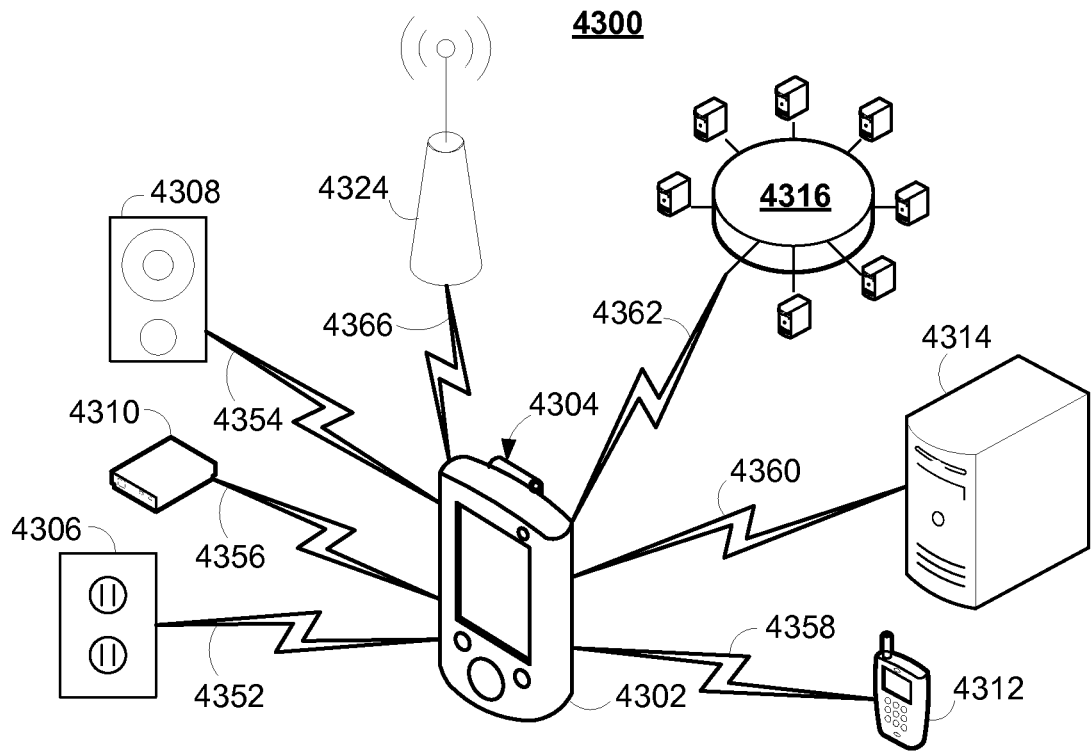
FIG. 43 is a diagram of an illustrative portable user device arrangement in accordance with some embodiments of the present disclosure.

Shown in FIG. 43 is a diagram of illustrative portable user device arrangement 4300 in accordance with some embodiments of the present disclosure. Portable user device 4302 may include processing equipment (e.g., a processor, parallel processors, a local processor, remote processor, multiple processors), cache, memory (e.g., ROM, RAM), communications interfaces, a rechargeable battery, clip member 4304, any other hardware components, or suitable combinations thereof. Portable user device 4302 may be a portable computer, personal communications device (e.g., mobile phone, smart phone), personal media device (e.g., MP3 player), personal digital assistant (PDA), any other suitable portable user device, or any combination of portable user devices thereof.

Power supply 4306 may provide charging, discharging, recharging, or any other suitable electrical energy transfer with portable user device 4302 via power path 4352. Power supply may include any suitable power sources such as, for example, a solar cell, a battery, a super-capacitor, a wall socket (e.g., coupled to a suitable power transmission network), any other suitable power source, or any suitable combination thereof. For example, in an illustrative example, power supply 4306 may include both a photovoltaic cell array (e.g., with suitable power conditioning circuitry) and 120 VAC provided from a power transmission network to provide electrical energy to portable user device 4302. In some embodiments power supply 4306 may operate at 120 VAC, any suitable DC voltage, or any suitable combination thereof. Power coupling 4352 may include one or more transformers (e.g., AC-DC transformer, DC-DC transformer), inverters, plugs and socket connections (e.g., 120 VAC 2 or 3 prong plugs and sockets, USB type connectors), power cords, any other suitable components, or any combinations thereof. In some embodiments, one or more components of power supply 4306 may reside integral to portable user device 4302. For example, portable user device 4302 may include a built-in photovoltaic cell which may provide charging to a rechargeable battery also included in portable user device 4302.

Audio device 4308 provides audio output to a user, receives audio input from a user, or both, and may be coupled to portable user device 4302 by communications path 4354. In some embodiments, audio device 108 may be a part of (e.g., integrated into) portable user device 4302. Audio device 4308 may be headphones, a headset, earphones, or any other suitable audio device or any combination thereof. Audio device 4308 may also include controls and an interface for adjusting volume, such as, for example, a volume-adjust knob or mute button. In some embodiments, communications path 4354 may include, for example, a tip/ring/sleeve (TRS) plug of any suitable size (e.g., a 3.5 mm earphone "jack"), RCA-type plug, corresponding sockets, insulated wires, any other suitable components, or any suitable combination thereof. In some embodiments, communications path 4354 may be a wireless communication path. For example, in some embodiments, audio device 4308 may include a BLUETOOTH® headset, and communications path 4354 may include a BLUETOOTH® protocol.

Portable memory device 4310 may be used for storing or recalling data, applications, or both, and may be coupled to portable user device 4302, via communications path 4356. Portable memory device 4310 may be a portable hard drive, flash memory drive, MultiMediaCard (MMC), SecureDigital (SD) card, subscriber identity module (SIM) card, compact disk, compact disk reading and/or writing device, zip drive, disk drive, any other suitable memory device, or combination thereof. Communications path 4356 may be a universal serial bus (USB) coupling, MMC coupling, SD coupling, any other suitable communications path or any combination thereof.

Auxiliary device 4312 may be coupled to portable user device 4302 via communications path 4358. Auxiliary device 4312 may be a mobile phone, smart phone (e.g., iPhone®), personal digital assistant (PDA), personal media player (e.g., iPod®), accessory, a gaming console, any other suitable device, or any combination thereof. In some embodiments, for example, auxiliary device 4312 may be second portable user device which may be clipped (i.e., docked) to portable user device 4302.

Computer 4314 may be coupled to portable user device 4302 via communications path 4360. Computer 4314 may be a general computer, specific computer, personal computer, laptop computer, tablet computer, remote computing facility, any other suitable type of computing device, or any combination thereof. Communications path 4360 may include any type of suitable wired or wireless path such as, for example, a local area network (LAN), WiFi network, BLUETOOTH network, USB wire connection, fiber optic cable network, IR wireless optical path, or any combinations thereof which may allow communication between portable device 4302 and computer 4314.

Network 4316 may be coupled to portable user device 4302 via communications path 4362. Communications path 4362 may be an optical network, wired network, wireless network, internet, ethernet, any other suitable network or combinations thereof. Wired networks may include wide area networks (WANs), LANs, any other suitable wired network or any combination thereof. Wireless networks may include wireless LANs (WLANs), wireless WANs (WWANs), WiFi networks (e.g., IEEE 802.11 standard), communications networks, or other suitable network or any combination thereof.

Wireless network 4324 may be coupled to portable user device 4302 via communications path 4366. Communications path 4366 may include WiFi, wireless area networks of any scale, or cellular telephone networks such as Global System for Mobile Communications (GSM), Personal Communications Service (PCS), or Mobile Web, or any other wireless communication network. Communications path 4366 may include any suitable hardware, software, or both such as, for example, antennas, routers, wireless access points, network bridges, wireless adapters, modems, any other suitable hardware or software, or any suitable combination thereof.

Illustrative arrangement 4300 shown in FIG. 43 represents some embodiments of hardware systems and networks which may be used to distribute and consume media, transfer data, provide charging, and other suitable functions. In some embodiments, portable user device 4302 may include, but is not limited to, any combination of hardware and communications paths shown in FIG. 43 or discussed in the context of FIG. 43.

In some embodiments, portable user device 4302 may be capable of being docked via clip member 4304 to power supply 4306, audio device 4308, memory device 4310, auxiliary device 4312, computer 4314, any other suitable device, or any combinations thereof, for data transferring, charging, any other suitable function, or any combination thereof. For example, portable user device 4302 may be clipped (i.e., docked) onto a suitable receiving receptacle of computer 4314, and data (e.g., contact list, media content files, e-mail messages) may be synchronized between portable user device 4302 and computer 4314. In some embodiments, communications path 4354, 4356, 4358, 4360, 4362, power path 4352, any other suitable path, or any combination thereof may include coupling portable user device 4302 via clip member 4304. For example, in some embodiments, portable user device 4302 may be docked to a docking device which includes both power supply 4306 and computer 4314. Portable user device may be coupled to the docking device by clip member 4304 which may include one or more electrical terminals which may correspond to one or more electrical terminals on the docking device. Any suitable docking arrangement may be used to charge, transfer data to or from, or both, portable user device 4302.

Figure 44:
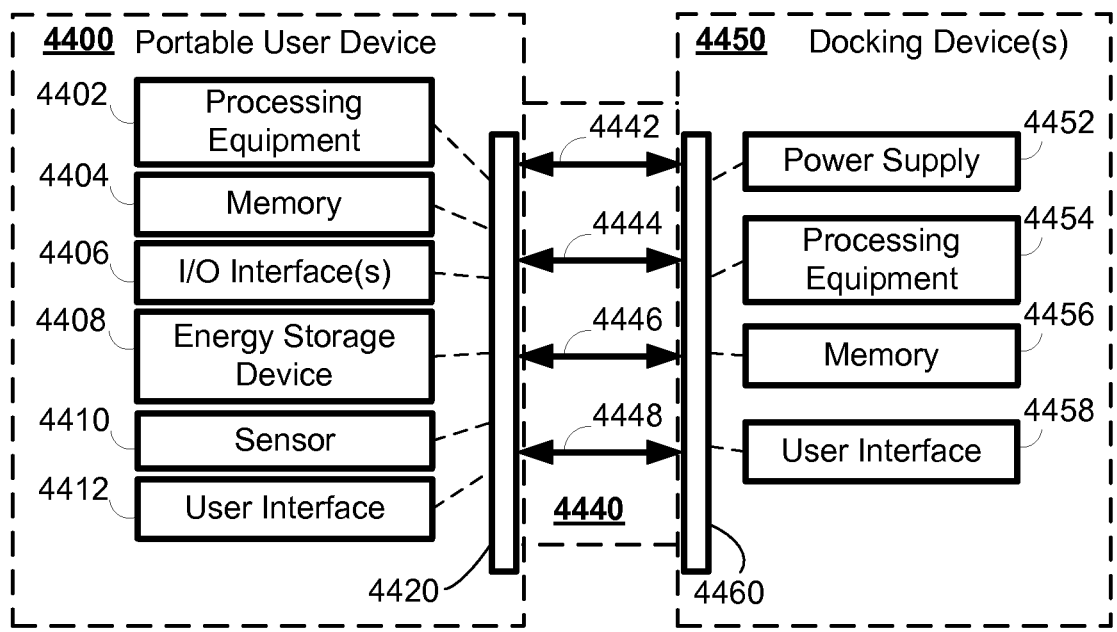
FIG. 44 is a diagram of an illustrative portable user device, docking device and couplings in accordance with some embodiments of the present disclosure.

Shown in FIG. 44 is a diagram of illustrative portable user device 4400, one or more docking devices 4450, and various couplings in accordance with some embodiments of the present disclosure. Portable user device 4400 may include processing equipment 4402, memory 4404, input/output (I/O) interface 4406, energy storage device 4408, sensor 4410, user interface 4412, any other suitable components, subsystems or devices, or any suitable combination thereof.

In some embodiments, portable user device 4400 may include port 4420 which may include any suitable type of couplings, or combination of couplings, which may interface (e.g., dock) with other devices, systems or components. For example, in some embodiments, port 4420 may be configured to engage receiving receptacle 4460. Port 4420 may be coupled to receiving receptacle 4460 via coupling 4440 which may include electrical couplings, mechanical couplings, optical couplings, wireless couplings, any other suitable coupling, or any combination thereof. For example, coupling 4440 may represent contact between corresponding electrical terminals of port 4420 and receiving receptacle 4460. In some embodiments, coupling 4440 may include hardware components such as, for example, clip members, wires, bundled wires, electrical terminals, arrays of electrical terminals, suitable connectors (e.g., plugs, sockets), fiber optic cables, any other suitable components, or any combination thereof. In some embodiments, port 4420 may include one or more groupings of electrical terminals. For example, port 4420 may include a first group of terminals for data transfer, and a second group of terminals for charging.

In some embodiments, port 4420 may include one or more mechanisms such as, for example, clip mechanisms (e.g., clip members and coupling pivot) including communication terminals, latches, springs, guides (e.g., to maintain alignment during docking), movable terminal covers (e.g., to protect terminals when not docked), any other suitable component which may provide a suitable mechanical function, or any combination thereof. For example, in some embodiments, port 4420 may include one or more electrical terminals arranged on one or more clip members which may correspond to one or more electrical terminals included in a suitable docking device. Docking may include clipping port 4420 of portable user device 4400 onto receiving receptacle 4460 of docking device 4450.

In some embodiments, port 4420 may include terminal covers which may protect and cover terminals when portable user device 4400 is not docked. For example, the act of docking portable user device 4400 to a suitable docking device may move or otherwise adjust the cover to expose the terminals and allow contact of the terminals with corresponding terminals on the docking device. In a further example, port 4420 may include spring loaded features such as pins or tabs. Spring loaded features may aid in providing contact force during docking.

In some embodiments, portable user device 4400 may be coupled to power supply 4452, processing equipment 4454, memory 4456, user interface 4458, any other suitable component, or any combination thereof via coupling 4440. Coupling 4440 may include, for example, data coupling 4442, power coupling 4444, diagnostic coupling 4446, accessory couplings 4448, any other suitable coupling types, or any combination thereof. In some embodiments, a docking device may be coupled to, but not include, power supply 4452, processing equipment 4454, memory 4456, or user interface 4458. For example, a docking device may include a suitable collection of electrical terminals which may interface with electrical terminals of a portable user device, and the docking device may be coupled via USB cable to an external device such as a computer.

In some embodiments, portable user device 4400 may include processing equipment 4402 which may include a central processing unit (CPU) (e.g., microprocessor), collection of processors (e.g., parallel processors), CPU cache, random access memory (RAM), I/O communications interfaces, suitable circuitry, any other suitable processing elements or any combination thereof.

In some embodiments, portable user device 4400 may include memory 4404 which may be a hard drive, flash memory drive, MMC, SD card, SIM card, any other suitable memory device, or combination thereof.

In some embodiments, portable user device 4400 may include I/O interface 4406. For example, I/O interface 4406 may allow portable user device 4400 to communicate with any type of device or network including an audio device, memory device, personal communication device, computer, wired network, wireless network, any other suitable device or network, or any combination thereof.

In some embodiments, portable user device 4400 may include energy storage device 4408. Energy storage device 4408 may include, for example, a primary battery, a secondary battery, a super capacitor, any other suitable component which may store energy, or any combination thereof. For example, energy storage device 4408 may be a lithium-ion (Li-ion) battery, nickel metal-hydride (NiMH) battery, alkaline battery, any other suitable type of battery, or any suitable combination thereof. In some embodiments, energy storage device 4408 may include a power source such as, for example, a photovoltaic cell and suitable accompanying power conditioning circuitry.

In some embodiments, portable user device 4400 may include sensor 4410. Sensor 4410 may include any suitable type of sensor, circuit, device, component, or combinations thereof which may be used to indicate a state of portable user device 4400. For example, sensor 4410 may sense whether portable user device 4400 is docked to a suitable docking device. Sensor 4410 may be coupled to one or more terminals of port 4420, which when docked are coupled via diagnostic coupling 4446 to corresponding terminals of receiving receptacle 4460 of one or more docking devices 4450. In a further example, sensor 4410 may trigger an alarm or other indicator if portable user device is not completely docked to a docking device (e.g., incomplete coupling of port 4420 to receiving receptacle 4460). The phrase "complete docking" may refer to docking in which all corresponding terminals of a portable user device and a receiving receptacle are coupled and any suitable functions are allowed. For example, incomplete docking may include not achieving electrical contiguity between corresponding electrical terminals of port 4420 and receiving receptacle 4460, which may prevent charging of energy storage device 4408.

In some embodiments, portable user device 4400 may include user interface 4412. User interface 4412 may include any suitable combination of user input interface, user input device, or both, which may allow portable user device 4400 to receive user input or provide output to a user. For example, user interface 4412 may include a button, a keypad (e.g., an array of hard button commands), a mouse, a touchpad, a touchscreen (e.g., one or more soft button commands), a rotary selector (e.g., a dial), a headset, earphones, headphones, a microphone, a camera, any other suitable component, or any suitable combination thereof.

In some embodiments, power supply 4452 may include any suitable type of power source used to supply power to portable user device 4400 via power coupling 4444. In some embodiments, processing circuitry 4454 may include any suitable CPU, collection of processors, CPU cache, RAM, I/O communications interfaces, suitable circuitry, any other suitable processing elements or any combination thereof. In some embodiments, memory 4456 may include any suitable memory hardware, software or both. In some embodiments, user interface 4458 may include a button, a keypad, a mouse, a touchpad, a touchscreen, a rotary selector, a headset, earphones, headphones, a microphone, a camera, any other suitable component, or any suitable combination thereof.

In some embodiments, any components of portable user device 4400 may be suitably coupled to port 4420, which may interface to any suitable docking device. For example, in some embodiments, port 4420 may interface to receiving receptacle 4460 by contact (e.g., mating of suitable corresponding terminals) which may be included in a computer. The computer may include power supply 4452 (e.g., a DC power supply), processing equipment 4454 (e.g., a CPU and accompanying hardware), memory 4456 (e.g., RAM, ROM, removable memory), user interface 4458 (e.g., keyboard, mouse, speaker), any other suitable components, or any combination thereof. In some embodiments, coupling 4440 may represent the contact between suitable terminals included in port 4420 of portable user device 4400 and suitable terminals of receiving receptacle 4460 of the computer.

In an illustrative example, a set of earphones (e.g., of user interface 4458) may include a male 3.5 mm TRS plug (e.g., receiving receptacle 4460). Port 4420 of portable user device 4400 may include a female 3.5 mm TRS socket. The male plug may be coupled to the female socket via accessory coupling 4448, which may represent direct contact of the corresponding parts of the TRS plug and socket.

In a further illustrative example, power supply 4452 may include a DC power supply. Receiving receptacle 4460 may include two electrical terminals (e.g., a positive terminal and a negative terminal) electrically coupled to the DC power supply. Port 4420 of portable user device 4400 may include two corresponding electrical terminals electrically coupled to energy storage device 4408. The corresponding electrical terminals of port 4420 and receiving receptacle 4460 may be coupled via power coupling 4444, which may represent direct contact of the corresponding electrical terminals. The direct contact between corresponding electrical terminals of port 4420 and receiving receptacle 4460 may be maintained by clipping portable user device 4400 to receiving receptacle 4460.

In a further illustrative example, processing equipment 4454 may be coupled to memory 4456 which may store media such as a particular music file. Receiving receptacle 4460 may include an array of electrical terminals electrically coupled to processing equipment 4454. Port 4420 of portable user device 4400 may include corresponding electrical terminals electrically (e.g., on at least one clip member) coupled to processing equipment 4402, which may be further coupled to memory 4404. The corresponding electrical terminals of port 4420 and receiving receptacle 4460 may be coupled via data coupling 4442, which may represent direct contact of the corresponding electrical terminals. While docked (e.g., clipped onto receiving receptacle 4460), portable user device 4400 may download the particular music file to memory 4404 from memory 4456. Note that any suitable data may be uploaded, downloaded, or both, via data coupling 4442.

In some embodiments, coupling 4440 may include more than one array of terminals. For example, port 4420 may include two arrays of electrical terminals, arranged in two different locations on portable user device 4400. Each array may dock separately to corresponding arrays of electrical terminals of receiving receptacle 4460 included in one or more docking devices 4450. In some embodiments, different arrays of terminals may be used to dock a portable user device for different functionalities. For example, port 4420 may include two arrays of electrical terminals, arranged in two different locations on portable user device 4400. One array may allow charging when docked to a suitable docking device via power coupling 4444, while the other may allow data transferring when docked to a suitable docking device via data coupling 4442. In some embodiments, receiving receptacles allowing different functionalities may be included in the same docking device, separate docking devices, any other suitable device, or any combination thereof.

It will be understood that various directional and orientational terms such as "horizontal" and "vertical," "top" and "bottom" and "side," "length" and "width" and "height" and "thickness," "inner" and "outer," "internal" and "external," and the like are used herein only for convenience, and that no fixed or absolute directional or orientational limitations are intended by the use of these words. For example, the components and elements of this disclosure may have any desired orientation. If reoriented, different directional or orientational terms may need to be used in their description, but that will not alter their fundamental nature as within the scope and spirit of this disclosure.

It will also be understood that the previously discussed embodiments and examples are only illustrative of aspects of the disclosed portable user devices, and are not presented for purposes of limitation. It will be understood that various clip member coupling techniques may be made available to the user and examples included herein are solely for convenience. Those skilled in the art will appreciate that the disclosed portable user devices may be practiced by other than the described embodiments, and the disclosure is limited only by the claims that follow.

What is claimed is:

1. A portable user device, comprising:
a first clip member including a protrusion extending from a surface of the first clip member;
a second clip member positioned opposite the first clip member;
a rechargeable battery incorporated in one of the first clip member and the second clip member; and
at least one electrical terminal positioned on a surface of the protrusion and electrically coupled to the rechargeable battery,
wherein when the rechargeable battery is charged by electrically coupling the at least one electrical terminal to a receiving receptacle the first clip member provides a clamping force in cooperation with the second clip member that helps to maintain contact between the receiving receptacle and the at least one electrical terminal.

2. The portable user device of claim 1, further comprising processing equipment electrically coupled to at least one of the electrical terminals.

3. The portable user device of claim 2, wherein the processing equipment is configured to determine whether the at least one electrical terminal is electrically coupled to the receiving receptacle.

4. The portable user device of claim 1, wherein the portable user device is configured to synchronize data with an external device using the at least one electrical terminal.

5. The portable user device of claim 1, further comprising:
a first port that comprises the at least one electrical terminal; and
a second port that comprises at least one other electrical terminal.

6. The portable user device of claim 5, wherein the second port is configured to communicate with a component selected from the list consisting of an audio device, a memory device, a power supply, a portable user device, a computer, and any combination thereof.

7. A portable user device comprising:
a first clip member comprising an energy storage device incorporated within the first clip member;
a second clip member comprising a member protruding from a surface of the second clip member and at least one electrical terminal disposed along a surface of the member, wherein the at least one electrical terminal is electrically coupled to the energy storage device; and
a coupling pivot coupled to both the first and second clip members, wherein the first and second clip members provide a clamping force in part through the at least one electrical terminal.

8. The portable user device of claim 7, wherein the coupling pivot allows the first and second clip members to rotate relative to each other about a pivot axis, and wherein a clamping force is generated by the coupling pivot between the first and second clip members.

9. The portable user device of claim 7, wherein the first clip member further comprises processing equipment.

10. The portable user device of claim 7, wherein the second clip member comprises:
solid state memory circuitry; and
at least one auxiliary electrical terminal on the second clip member, wherein the at least one auxiliary electrical terminal is electrically coupled to the solid state memory circuitry.

11. The portable user device of claim 7, wherein the coupling pivot comprises a spring.

12. The portable user device of claim 7, wherein the coupling pivot comprises a flexural pivot.

13. The portable user device of claim 7, wherein the coupling pivot comprises a hinge.

14. The portable user device of claim 7, wherein the coupling pivot comprises at least one rotating contact electrically coupled to the at least one electrical terminal.

15. The portable user device of claim 1, wherein the at least one electrical terminal comprises a pin.

16. A portable user device, comprising:
a first clip member;
a second clip member positioned opposite the first clip member;
a rechargeable battery incorporated in at least one of the first clip member and the second clip member; and
an electrical terminal positioned along a surface of the first clip member that is electrically coupled to the rechargeable battery,
wherein when the electrical terminal is directly electrically coupled to a receiving receptacle, the first and second clip members provide a clamping force that compresses a portion of the first clip member that at least partially surrounds the electrical terminal against a portion of the receiving receptacle.

17. The portable user device as recited in claim 16, wherein the electrical terminal is positioned at a distal end of the first clip member.

18. The portable user device as recited in claim 16, wherein the electrical terminal is recessed with respect to an exterior surface of the first clip member.

19. The portable user device as recited in claim 16, when the electrical terminal is electrically coupled to the receiving receptacle, a surface of the electrical terminal contacts and is electrically coupled with an electrical terminal of the receiving receptacle, the surface of the electrical terminal being substantially parallel with the surface of the first clip member along which the electrical terminal is positioned.

* * * * *